(12) United States Patent
Fujimura et al.

(10) Patent No.: US 11,473,445 B2
(45) Date of Patent: Oct. 18, 2022

(54) STEAM TURBINE PLANT AND COOLING METHOD FOR SAME

(71) Applicant: Mitsubishi Power, Ltd., Yokohama (JP)

(72) Inventors: Daiki Fujimura, Yokohama (JP); Susumu Sekine, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/049,371

(22) PCT Filed: Mar. 27, 2019

(86) PCT No.: PCT/JP2019/013339
§ 371 (c)(1),
(2) Date: Oct. 21, 2020

(87) PCT Pub. No.: WO2019/220786
PCT Pub. Date: Nov. 21, 2019

(65) Prior Publication Data
US 2021/0246809 A1    Aug. 12, 2021

(30) Foreign Application Priority Data

May 14, 2018 (JP) .............................. JP2018-093301

(51) Int. Cl.
*F01D 25/12* (2006.01)
*F01D 15/00* (2006.01)
(Continued)

(52) U.S. Cl.
CPC ............ *F01D 25/12* (2013.01); *F01D 15/00* (2013.01); *F01D 19/00* (2013.01); *F01K 13/003* (2013.01);
(Continued)

(58) Field of Classification Search
CPC .......... F01D 25/12; F01D 15/00; F01D 19/00; F22B 37/38; F01K 13/025; F01K 23/101;
(Continued)

(56) References Cited

U.S. PATENT DOCUMENTS

| 5,042,246 A | * | 8/1991 | Moore | .................... F02C 7/268 60/773 |
| 2010/0229523 A1 | * | 9/2010 | Holt | ........................ F01K 23/10 60/39.182 |
| 2015/0316324 A1 | * | 11/2015 | Rop | ......................... F28B 1/02 165/110 |

FOREIGN PATENT DOCUMENTS

| JE | 53-118605 | 10/1978 | |
| JP | 58117306 A | * 7/1983 | ........... F01K 13/025 |

(Continued)

OTHER PUBLICATIONS

International Search Report dated Jun. 18, 2019 in corresponding International (PCT) Patent Application No. PCT/JP2019/013339, with English Translation.
(Continued)

*Primary Examiner* — Mickey H France
(74) *Attorney, Agent, or Firm* — Wenderoth, Lind & Ponack, L.L.P.

(57) ABSTRACT

A steam turbine plant is provided with: a boiler; a fuel valve; a low-temperature steam generation source; a steam turbine; a main steam line that guides steam generated in the boiler to the steam turbine; a main steam adjustment valve that is provided to the main steam line; a low-temperature steam line that guides low-temperature steam from the low-temperature generation source to a position closer to the steam turbine-side than the main steam adjustment valve in the main steam line; a low-temperature steam valve provided to the low-temperature steam line; and a control device. During a stopping process of the steam turbine plant, the control
(Continued)

device sends a command to close the fuel valve, and then sends a command to open the low-temperature steam valve.

18 Claims, 8 Drawing Sheets

(51) Int. Cl.
| | |
|---|---|
| *F01D 19/00* | (2006.01) |
| *F01K 13/00* | (2006.01) |
| *F02C 6/00* | (2006.01) |
| *F02C 9/28* | (2006.01) |
| *F01K 13/02* | (2006.01) |
| *F01K 23/10* | (2006.01) |
| *F22B 37/38* | (2006.01) |

(52) U.S. Cl.
CPC ............ *F01K 13/02* (2013.01); *F01K 13/025* (2013.01); *F01K 23/101* (2013.01); *F02C 6/00* (2013.01); *F02C 9/28* (2013.01); *F22B 37/38* (2013.01); *F05D 2220/31* (2013.01); *F05D 2220/72* (2013.01); *F05D 2220/74* (2013.01); *F05D 2260/20* (2013.01); *F05D 2270/303* (2013.01)

(58) Field of Classification Search
CPC .......... F01K 13/02; F01K 13/003; F01K 3/22; F02C 6/00; F02C 9/28; F05D 2220/31; F05D 2220/72; F05D 2220/74; F05D 2260/20; F05D 2270/303
USPC .................................. 60/646, 656, 657, 658
See application file for complete search history.

(56) References Cited

FOREIGN PATENT DOCUMENTS

| | | |
|---|---|---|
| JP | 04-140403 | 5/1992 |
| JP | 06-050106 | 2/1994 |
| JP | 2001-289009 | 10/2001 |
| JP | 2006-009787 | 1/2006 |

OTHER PUBLICATIONS

Written Opinion dated Jun. 18, 2019 in corresponding International (PCT) Patent Application No. PCT/JP2019/013339, with English Translation.

\* cited by examiner

STEAM TURBINE PLANT AND COOLING METHOD FOR SAME

TECHNICAL FIELD

The present invention relates to a steam turbine plant which includes a boiler and a steam turbine driven by steam from the boiler, and a cooling method for the same.

This application claims priority to Japanese Patent Application No. 2018-093301, filed in Japan on May 14, 2018, the contents of which are incorporated herein by reference.

BACKGROUND ART

In a case of inspecting a steam turbine plant, it is necessary to wait until the temperature of the steam turbine is reduced to a temperature at which inspection work can be performed on the steam turbine. In order to reduce the waiting time, there are various methods of cooling the steam turbine.

A first method is a method of forcibly cooling the steam turbine using cooling air by stopping the steam turbine and then sending cooling air into the steam turbine.

A second method is a method disclosed in PTL 1 described below. In the second method, in a stopping process of the steam turbine, while the pressure of steam before reaching an adjustment valve from the boiler is increased, the opening degree of the adjustment valve is narrowed to reduce the temperature of steam flowing into the steam turbine, so that the steam turbine is cooled by the steam. PTL 1 proposes that after the steam turbine is stopped, natural cooling or forced cooling using cooling air is performed to further reduce the temperature of the steam turbine.

CITATION LIST

Patent Literature

[PTL 1] Japanese Unexamined Patent Application Publication No. 04-140403

SUMMARY OF INVENTION

Technical Problem

In a case of inspecting a steam turbine plant, it is necessary to also cool the boiler that supplies steam to the steam turbine. In a general method of cooling the boiler, first, the supply of a fuel for generating steam is cut off, and the adjustment valve that adjusts a flow rate of steam flowing into the steam turbine is closed. Then, the water in a condenser is supplied to the boiler, and the water that has passed through the boiler is discharged from the boiler. In a case of executing this method, it is necessary to suppress the oxygen concentration in the water supplied to the boiler in order to suppress the rust generation. Therefore, it is necessary to avoid that cooling air enters the condenser, by causing the cooling air not to be supplied to the steam turbine during the boiler cooling.

Thus, in the first method and the second method, the steam turbine cannot be forcibly cooled until the boiler cooling is ended after the fuel supply is cut off, and thus there is a problem in that the cooling end of the steam turbine is delayed.

An object of the invention is to provide a technique capable of accelerating the cooling end of the steam turbine.

Solution to Problem

A steam turbine plant according to an aspect of the invention for solving the problem includes a boiler that generates steam; a fuel valve that adjusts a flow rate of a fuel for generating the steam; a low-temperature steam generation source that generates low-temperature steam independently of the boiler; a steam turbine that is driven by the steam from the boiler; a main steam line that guides the steam generated by the boiler to a steam inlet of the steam turbine; a main steam adjustment valve that is provided to the main steam line, and adjusts a flow rate of the steam flowing into the steam turbine from the boiler; a low-temperature steam line that is connected to the low-temperature steam generation source, and guides the low-temperature steam from the low-temperature steam generation source to the main steam line at a position closer to the steam turbine than the main steam adjustment valve; a low-temperature steam valve that is provided to the low-temperature steam line, and adjusts a flow rate of the low-temperature steam flowing in the low-temperature steam line; and a control device.

The control device sends an open instruction to the low-temperature steam valve after sending a close instruction to the fuel valve.

In this aspect, in a stopping process of the steam turbine plant, the steam turbine can be cooled by the low-temperature steam after the supply of the fuel is cut off. Therefore, in this aspect, the cooling of the steam turbine can be started before a vacuum state of the condenser that returns the steam from the steam turbine to water is broken.

In the steam turbine, during the operation, among blades of respective stages, the blades on the upstream side are exposed to the high-temperature steam more than the blades on the downstream side in the steam flow so that the blades on the upstream side have a high temperature. Therefore, as in this aspect, by causing the low-temperature steam to flow into the steam turbine from the steam inlet of the steam turbine, the blade on the upstream side having a high temperature can be efficiently cooled.

Here, in the steam turbine plant in the aspect, the low-temperature steam generation source may have a second boiler that generates steam independently of a first boiler which is the boiler, and a temperature reducer that reduces a temperature of the steam from the second boiler to generate the low-temperature steam.

However, in the steam turbine plant in the aspect which has the temperature reducer, when a predetermined condition is satisfied after an open instruction is sent to the low-temperature steam valve, the control device may send an instruction to reduce the temperature of the low-temperature steam to the temperature reducer.

In this aspect, it is possible to suppress the thermal shock with respect to the steam turbine and to efficiently cool the steam turbine.

The steam turbine plant in any aspect described above may further include a drain discharge line that is connected to the low-temperature steam line to be closer to the low-temperature steam generation source than the low-temperature steam valve, and discharges the low-temperature steam and drain of the low-temperature steam in the low-temperature steam line; and a drain valve that is provided to the drain discharge line. In this case, the control device sends an open instruction to the drain valve after sending a close instruction to the fuel valve, and sends a close instruction to the drain valve and sends an open instruction to the low-temperature steam valve when a predetermined time passes after the open instruction is sent to the drain valve.

In this aspect, it is possible to warm the low-temperature steam line with the low-temperature steam before the low-temperature steam is supplied to the steam turbine. Therefore, in this aspect, it is possible to suppress that a part of the low-temperature steam is liquefied in the process of passing through the low-temperature steam line at the time of the start of the supply of the low-temperature steam to the steam turbine. That is, in this aspect, it is possible to suppress the drain amount of the low-temperature steam flowing to the steam turbine at the time of the start of the supply of the low-temperature steam to the steam turbine.

The steam turbine plant in any aspect described above may further include a bypass line that branches from the main steam line at a position closer to the boiler than the main steam adjustment valve, and guides the steam from the boiler to the main steam line at a position closer to the steam turbine than the main steam adjustment valve; a surplus steam valve that adjusts a flow rate of the steam flowing in the bypass line; and a pressure detector that detects a pressure in the main steam line at a position closer to the boiler than the main steam adjustment valve. In this case, the control device sends a close instruction to the main steam adjustment valve and an open instruction to the surplus steam valve in accordance with the transmission of the close instruction to the fuel valve, and sends an open instruction to the low-temperature steam valve when the pressure detected by the pressure detector is equal to or less than a predetermined pressure.

In this aspect, before the low-temperature steam is supplied to the steam turbine, the steam from the boiler after the supply of the fuel is cut off is supplied to the steam turbine, and the steam turbine is cooled by the steam. The temperature of the steam generated from the boiler is almost unchanged immediately before and after the supply of the fuel is cut off. Therefore, in this aspect, it is possible to minimize the thermal shock given to the steam turbine before and after the supply of the fuel is cut off.

Further, the steam turbine plant in any aspect described above may further include a pressure detector that detects a pressure in the main steam line at a position closer to the boiler than the main steam adjustment valve. In this case, the control device sends a slight open instruction to reduce a valve opening degree to the main steam adjustment valve in accordance with the transmission of the close instruction to the fuel valve, and sends an open instruction to the low-temperature steam valve when the pressure detected by the pressure detector is equal to or less than a predetermined pressure.

Also in this aspect, before the low-temperature steam is supplied to the steam turbine, the steam from the boiler after the supply of the fuel is cut off is supplied to the steam turbine, and the steam turbine is cooled by the steam. Therefore, also in this aspect, it is possible to minimize the thermal shock given to the steam turbine immediately before and after the supply of the fuel is cut off.

The steam turbine plant in any aspect described above may further include a condenser that returns the steam from the steam turbine to water; a supply water line that guides water in the condenser to the boiler; a pump that is provided to the supply water line, and sends the water in the condenser to the boiler; a boiler water discharge line that is connected to a tube or drum through which water or steam passes in the boiler, and discharges the water or steam in the tube or drum to an outside of the boiler; and a boiler water discharge valve that is provided to the boiler water discharge line, and adjusts a flow rate of a fluid flowing in the boiler water discharge line. In this case, the control device sends a close instruction to the fuel valve, and then sends an open instruction to the boiler water discharge valve in a state of continuing to drive the pump.

In this aspect, since the water in the condenser is supplied to a tube or the like of the boiler after the supply of the fuel is cut off, the boiler can be cooled by the water.

In the steam turbine plant in the aspect which includes the condenser, the boiler water discharge line may be connected to the condenser.

In this aspect, the water supplied from the condenser to the boiler returns to the condenser through the boiler water discharge line. Thus, in this aspect, the water in the condenser can be efficiently used.

In the steam turbine plant in the aspect which includes the condenser, the control device may send an open instruction to the boiler water discharge valve such that at least a part of a time zone during which the low-temperature steam valve is open overlaps a time zone during which the boiler water discharge valve is open.

In this aspect, a steam turbine cooling step of cooling the steam turbine by supplying the low-temperature steam to the steam turbine and a boiler cooling step of cooling the boiler by supplying the water from the condenser to the boiler are executed in parallel. Therefore, in this aspect, the timing of completing both the boiler cooling step and the steam turbine cooling step can be accelerated.

The steam turbine plant in any aspect described above may include a temperature detector that detects a temperature of a location where the steam from the boiler comes into contact with the steam turbine. In this case, the control device sends a close instruction to the low-temperature steam valve when the temperature detected by the temperature detector is equal to or less than a predetermined temperature.

The steam turbine plant in any aspect described above which includes the condenser may further include a temperature detector that detects a temperature of a location where the steam from the boiler comes into contact with the steam turbine; a cooling air supplier that sends cooling air for cooling the steam turbine, into the steam turbine; and a cooling air line that is connected to the cooling air supplier, and guides the cooling air to the main steam line at a position closer to the steam turbine than the main steam adjustment valve. In this case, the control device sends a supply instruction to the cooling air supplier after sending a close instruction to the low-temperature steam valve when determining that cooling of the boiler is completed before the temperature detected by the temperature detector is equal to or less than the predetermined temperature, and sends a close instruction to the low-temperature steam valve when determining that the temperature detected by the temperature detector is equal to or less than the predetermined temperature before cooling of the boiler is completed.

In this aspect, when cooling of the boiler is completed during the steam turbine cooling step of cooling the steam turbine by the low-temperature steam, the steam turbine cooling step is stopped, and the steam turbine can be cooled by the cooling air from the cooling air fan.

The steam turbine plant in any aspect described above may include a gas turbine that is driven by combusting a fuel. In this case, the boiler is a heat recovery steam generator that generates steam by heat of combustion gas discharged from the gas turbine. In addition, the fuel valve is a valve that adjusts a flow rate of the fuel to be supplied to the gas turbine.

The steam turbine plant in the aspect which includes the gas turbine may further include a motor that rotates a gas turbine rotor of the gas turbine. In this case, after sending a close instruction to the fuel valve, the control device sends a spin operation instruction to the motor at a timing in which at least a part of a time zone during which the low-temperature steam valve is open overlaps a time zone during execution of a spin operation so as to execute the spin operation in which the gas turbine rotor is rotated at a rotation speed lower than a rated rotation speed of the gas turbine.

In this aspect, the gas turbine can be cooled.

A cooling method of a steam turbine plant according to another aspect of the invention for solving the problem is a cooling method of a steam turbine plant including a boiler that generates steam, a steam turbine that is driven by the steam from the boiler, a main steam line that guides the steam generated by the boiler to a steam inlet of the steam turbine, and a main steam adjustment valve that is provided to the main steam line, and adjusts a flow rate of the steam flowing into the steam turbine from the boiler.

The cooling method executes a fuel stopping step of stopping a supply of a fuel for generating steam in the boiler; and a low-temperature steam supply step of guiding low-temperature steam from a low-temperature steam generation source that generates low-temperature steam independently of the boiler, to the main steam line at a position closer to the steam turbine than the main steam adjustment valve, after the fuel stopping step.

Here, in the cooling method of a steam turbine plant in the aspect, the low-temperature steam generation source may reduce a temperature of the steam from the second boiler which is independent of a first boiler which is the boiler, to generate the low-temperature steam.

In the cooling method of a steam turbine plant in the aspect which reduces the temperature of the steam from the second boiler, in the low-temperature steam supply step, the temperature of the low-temperature steam may be further reduced when a predetermined condition is satisfied during the low-temperature steam supply step.

In the cooling method of a steam turbine plant in any aspect described above, the steam turbine plant includes a low-temperature steam line that is connected to the low-temperature steam generation source, and guides the low-temperature steam from the low-temperature steam generation source to the main steam line at a position closer to the steam turbine than the main steam adjustment valve, and a low-temperature steam valve that is provided to the low-temperature steam line, and adjusts a flow rate of the low-temperature steam flowing in the low-temperature steam line. In this case, the cooling method executes a drain discharge step of discharging the low-temperature steam and drain of the low-temperature steam in the low-temperature steam line on a side closer to the low-temperature steam generation source than the low-temperature steam valve, after the fuel stopping step, and the low-temperature steam supply step by opening the low-temperature steam valve, after the drain discharge step.

The cooling method of a steam turbine plant in any aspect described above may further execute a main steam stopping step of closing the main steam adjustment valve in accordance with the fuel stopping step; and a surplus steam supply step of supplying steam in the main steam line on a side closer to the boiler than the main steam adjustment valve, to the main steam line on a side closer to the boiler than the main steam adjustment valve after the fuel stopping step and the main steam stopping step. In this case, the low-temperature steam supply step is executed when a pressure in the main steam line at a position closer to the boiler than the main steam adjustment valve is equal to or less than a predetermined pressure.

The cooling method of a steam turbine plant in any aspect described above may further execute a surplus steam supply step of suppressing a flow rate of the steam flowing into the steam turbine from the boiler by reducing an opening degree of the main steam adjustment valve in accordance with the fuel stopping step. In this case, the low-temperature steam supply step may be executed when a pressure in the main steam line at a position closer to the boiler than the main steam adjustment valve is equal to or less than a predetermined pressure.

In the cooling method of a steam turbine plant in any aspect described above, the steam turbine plant may include a condenser that returns the steam from the steam turbine to water, a supply water line that guides water in the condenser to the boiler, and a pump that is provided to the supply water line, and sends the water in the condenser to the boiler. In this case, the cooling method may execute, after the fuel stopping step, a boiler cooling step of discharging water or steam in a tube through which the water or steam passes in the boiler, to an outside of the boiler, in a state of continuing to drive the pump.

In the cooling method of a steam turbine plant in the aspect which executes the boiler cooling step, in the boiler cooling step, the water or steam in the tube which has been discharged to the outside of the boiler may return to the condenser.

In the cooling method of a steam turbine plant in any aspect described above which executes the boiler cooling step, at least a part of a time zone during execution of the low-temperature steam supply step may overlap a time zone during execution of the boiler cooling step.

In the cooling method of a steam turbine plant in any aspect described above, when the temperature of the location where the steam from the boiler comes into contact with the steam turbine is equal to or less than the predetermined temperature after execution of the low-temperature steam supply step, the low-temperature steam supply step may be ended.

In the cooling method of a steam turbine plant in any aspect described above which executes the boiler cooling step, after the execution of the low-temperature steam supply step, when cooling of the boiler is completed before a temperature of a location where the steam from the boiler comes into contact with the steam turbine is equal to or less than a predetermined temperature, the low-temperature steam supply step may be ended and a cooling air supply step of sending cooling air into the steam turbine may be executed, and when the temperature of the location where the steam from the boiler comes into contact with the steam turbine is equal to or less than the predetermined temperature before cooling of the boiler is completed, the low-temperature steam supply step may be ended.

In the cooling method of a steam turbine plant in any aspect described above, the steam turbine plant may include a gas turbine that is driven by combusting a fuel. In this case, the boiler generates steam by heat of combustion gas discharged from the gas turbine. In addition, the fuel is a fuel to be supplied to the gas turbine.

In the cooling method of a steam turbine plant in the aspect which includes the gas turbine, the steam turbine plant may include a motor that rotates a gas turbine rotor of the gas turbine. In this case, after the fuel stopping step, a gas turbine cooling step of causing the motor to rotate the gas turbine rotor at a rotation speed lower than a rated rotation speed of the gas turbine may be executed.

In the cooling method of a steam turbine plant in the aspect which executes the gas turbine cooling step, at least a part of a time zone during execution of the low-temperature steam supply step may overlap a time zone during execution of the gas turbine cooling step.

Advantageous Effects of Invention

In the aspects of the invention, the steam turbine is cooled by the low-temperature steam from the low-temperature steam generation source independent of the boiler that generates steam for driving the steam turbine. Therefore, according to the aspect of the invention, it is possible to forcibly cool the steam turbine during boiler cooling after the supply of the fuel is cut off, and to accelerate the cooling end of the steam turbine.

DESCRIPTION OF EMBODIMENTS

Hereinafter, various embodiments of a steam turbine plant according to the invention will be described with reference to the drawings.

First Embodiment

A first embodiment of the steam turbine plant according to the invention will be described with reference to FIGS. 1 to 5.

Figure 1:
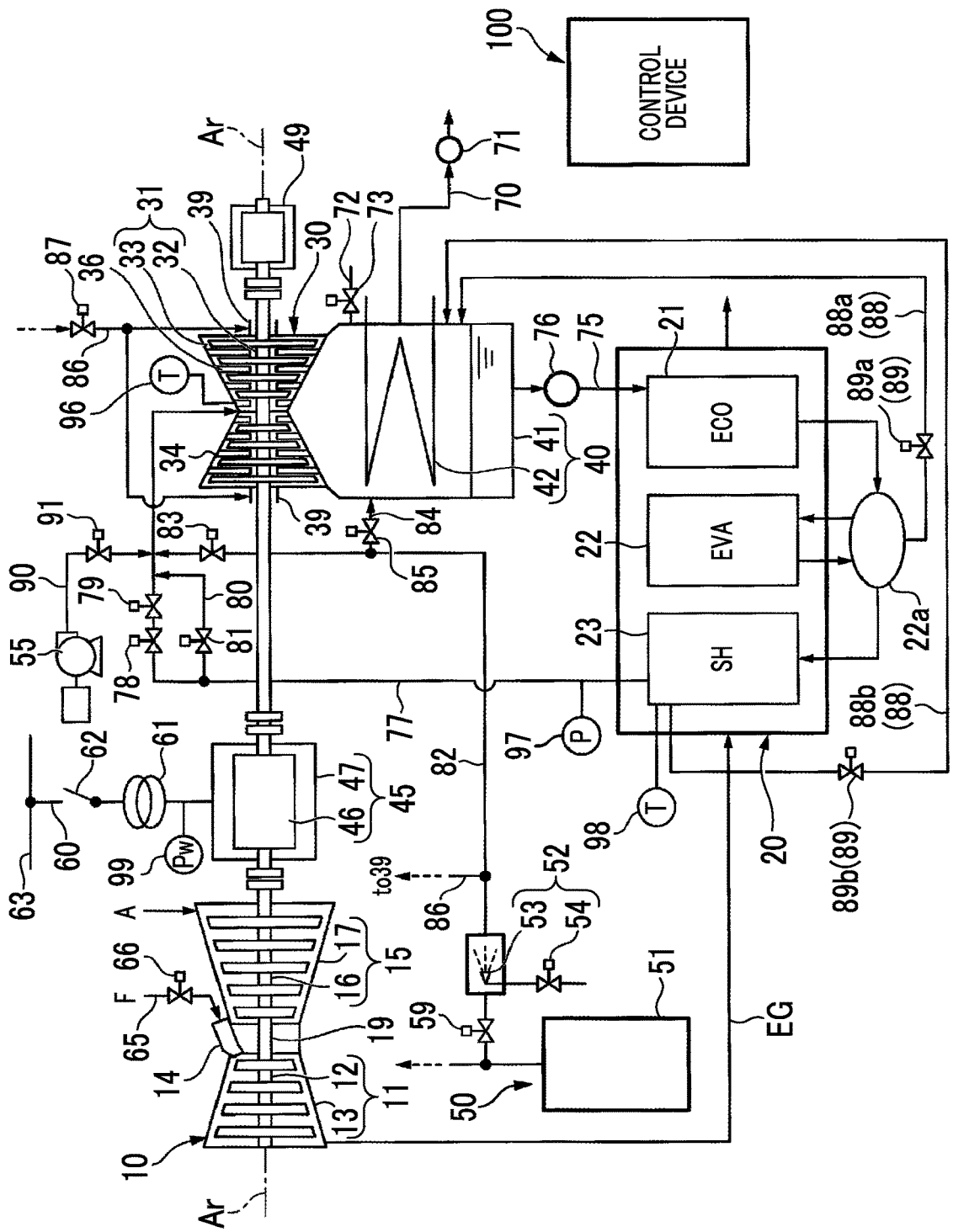
FIG. 1 is a system diagram of a steam turbine plant in a first embodiment according to the invention.

As illustrated in FIG. 1, the steam turbine plant of this embodiment includes a gas turbine 10, a heat recovery steam generator 20 that generates steam using exhaust gas EG from the gas turbine 10, a steam turbine 30 that is driven by the steam from the heat recovery steam generator 20, a condenser 40 that returns the steam from the steam turbine 30 to water, a water supply pump 76 that sends the water in the condenser 40 to the heat recovery steam generator 20, a generator 45, and a starter motor 49. The steam turbine plant of this embodiment is a combined cycle plant.

The gas turbine 10 includes a compressor 11 that compresses air A, a combustor 14 that combusts a fuel F in the air compressed by the compressor 11 to generate combustion gas, and a turbine 15 driven by high-temperature and high-pressure combustion gas. The compressor 11 has a compressor rotor 12 that is rotated around an axis Ar, and a compressor casing 13 that covers the compressor rotor 12. The turbine 15 has a turbine rotor 16 that is rotated around the axis Ar, and a turbine casing 17 that covers the turbine rotor 16. The compressor rotor 12 and the turbine rotor 16 are rotated around the same axis Ar, and are connected to each other to form a gas turbine rotor 19. A fuel supply line 65 that supplies the fuel F to the combustor 14 is connected to the combustor 14. A fuel valve 66 that adjusts the flow rate of the fuel F to be supplied to the combustor 14 is provided to the fuel supply line 65.

The heat recovery steam generator 20 has an economizer 21 that heats the water from the condenser 40 with the heat of the exhaust gas EG, an evaporator 22 that heats the water, which has been heated by the economizer 21, with the heat of the exhaust gas EG to generate steam, and a superheater 23 that further superheats the steam with the heat of the exhaust gas EG. Each of the economizer 21, the evaporator 22, and the superheater 23 has a heat transfer tube through which water or steam passes and which is for heat transfer between the water or steam and the exhaust gas EG. The evaporator 22 has a drum 22a in addition to the heat transfer tube. A heat transfer tube temperature detector 98 that detects the temperature of the heat transfer tube is provided in the vicinity of the outlet of the heat transfer tube of the superheater 23.

The steam turbine 30 has a steam turbine rotor 31 that is rotated around the axis Ar, a steam turbine casing that covers the steam turbine rotor 31, and a shaft seal device 39. The steam turbine rotor 31 has a rotor shaft 32 that is rotated around the axis Ar, and a plurality of rotor blade rows 33 fixed to the rotor shaft 32. The plurality of rotor blade rows 33 are arranged in an axis direction in which the axis Ar extends. A plurality of stator blade rows 36 are fixed to an inner peripheral surface of the steam turbine casing 34. The plurality of stator blade rows 36 are arranged in a direction in which the axis direction extends. Each of the plurality of stator blade rows 36 is disposed on the upstream side of any rotor blade row 33 among the plurality of rotor blade rows 33 in the steam flow. A metal temperature detector 96 that detects the temperature of the stator blades constituting a first stage stator blade row is provided to the first stage stator blade row that is disposed on the uppermost side in the steam flow among the plurality of stator blade rows 36. The shaft seal device 39 is a device for suppressing the outflow of steam in the steam turbine casing 34 from a gap between an end portion of the steam turbine rotor 31 and the steam turbine casing 34 by the steam from the outside. The steam turbine 30 illustrated in FIG. 1 is a double-exhaust steam turbine in which the steam having flowed is divided into two directions. However, the steam turbine 30 of this embodiment may be a steam turbine in which the steam having flowed is not divided.

The condenser 40 has a heat transfer tube 42 through which a cooling medium such as water flows, and a condenser casing 41 that covers the heat transfer tube 42. The steam from the steam turbine 30 flows into the condenser casing 41, and is cooled by the heat transfer with the cooling medium in the heat transfer tube 42 to become water. An exhaust line 70 that discharges gas in the condenser casing 41 to the outside to reduce the pressure in the condenser casing 41 is provided to the condenser casing 41. A vacuum pump 71 that suctions gas in the condenser casing 41 is provided to the exhaust line 70. An outside air line 72 that guides the outside air into the condenser casing 41 is further provided to the condenser casing 41. A vacuum breaker valve 73 is provided to the outside air line 72.

The generator 45 has a generator rotor 46 that is rotated around the axis Ar, and a generator casing 47 that covers the generator rotor 46. The generator 45 is electrically connected to an external system 63 by a connection line 60. A transformer 61 and a circuit breaker 62 are provided to the connection line 60. Further, a power detector (output detector) 99 is provided to the connection line 60 to be at a position closer to the generator 45 than the circuit breaker 62.

The gas turbine rotor 19, the steam turbine rotor 31, and the generator rotor 46 are positioned on the same axis Ar, and are mechanically connected to each other. Thus, the combined cycle plant of this embodiment is called a single-shaft combined cycle plant. The starter motor 49 rotates these rotors around the axis Ar. Since the generator rotor 46 is connected to both the gas turbine rotor 19 and the steam turbine rotor 31 as described above, the amount of power generated by the generator 45, that is, a generator output is an output that is the sum of a gas turbine output and a steam turbine output.

The steam turbine plant of this embodiment includes a low-temperature steam generation source 50 that generates low-temperature steam independently of the heat recovery steam generator 20, a cooling air fan (cooling air supplier) 55, and a control device 100 in addition to the above components. The low-temperature steam generation source 50 has an auxiliary boiler (second boiler) 51 that generates steam independently of the heat recovery steam generator 20, a pressure control valve 59 that reduces the pressure of the steam generated by the auxiliary boiler 51, and a temperature reducer 52 that lowers the temperature of the steam generated by the auxiliary boiler 51. The temperature reducer 52 has a nozzle 53 that sprays water for temperature reduction to the steam generated by the auxiliary boiler 51, and a temperature reduction water adjustment valve 54 that adjusts the flow rate of the water for temperature reduction to be supplied to the nozzle 53. The temperature reducer 52 reduces the temperature of the steam generated by the auxiliary boiler 51 to turn the steam into low-temperature steam. The temperature of the low-temperature steam is, for example, 140° C. The cooling air fan 55 suctions, for example, the outside air, and sends the outside air to the steam turbine casing 34 as the cooling air.

The steam turbine plant of this embodiment further includes a supply water line 75, a main steam line 77, a shut-off valve 78, an adjustment valve 79, a surplus steam bypass line 80 (hereinafter, simply referred to as a bypass line 80), a surplus steam bypass valve 81 (hereinafter, simply referred to as a surplus steam valve 81), a low-temperature steam line 82, a low-temperature steam valve 83, a drain discharge line 84, a drain valve 85, a shaft seal steam line 86, a shaft seal steam valve 87, a plurality of boiler water discharge lines 88, a plurality of boiler water discharge valves 89, a cooling air line 90, and a cooling air valve 91.

The supply water line 75 connects the condenser casing 41 and the economizer 21. The water supply pump 76 is provided to the supply water line 75. The main steam line 77 connects the superheater 23 and a steam inlet of the steam turbine casing 34. The shut-off valve 78 and the adjustment valve (main steam adjustment valve) 79 are provided to the main steam line 77. Further, a steam pressure detector 97 that detects the pressure of the steam is provided to the main steam line 77 so as to be closer to the superheater 23 than the shut-off valve 78 and the adjustment valve 79. A first end of the bypass line 80 is connected to the main steam line 77, at a position closer to the superheater 23 than the shut-off valve 78 and the adjustment valve 79. Further, a second end of the bypass line 80 is connected to the main steam line 77, at a position closer to the steam inlet than the shut-off valve 78 and the adjustment valve 79. That is, the bypass line 80 is a line that allows the steam from the superheater 23 to bypass the shut-off valve 78 and the adjustment valve 79. The surplus steam valve 81 is provided to the bypass line 80.

A first end of the low-temperature steam line 82 is connected to the temperature reducer 52, and a second end of the low-temperature steam line 82 is connected to the main steam line 77, at a position closer to the steam inlet than the shut-off valve 78 and the adjustment valve 79. The low-temperature steam valve 83 is provided to the low-temperature steam line 82. A first end of the drain discharge line 84 is connected to the low-temperature steam line 82, at a position closer to the temperature reducer 52 than the low-temperature steam valve 83, and a second end of the drain discharge line 84 is connected to the condenser casing 41. The drain valve 85 is provided to the drain discharge line 84. A first end of the shaft seal steam line 86 is connected to the low-temperature steam line 82, at a position closer to the temperature reducer 52 than a position where the drain discharge line 84 and the low-temperature steam line 82 are connected. A second end of the shaft seal steam line 86 is connected to the shaft seal device 39 of the steam turbine 30. The shaft seal steam valve 87 is provided to the shaft seal steam line 86.

Among the plurality of boiler water discharge lines 88, a first end of a first boiler water discharge line 88a is connected to a drum 22a of the evaporator 22. A second end of the first boiler water discharge line 88a is connected to the condenser casing 41. Among the plurality of boiler water discharge valves 89, a first boiler water discharge valve 89a is provided to the first boiler water discharge line 88a. Among the plurality of boiler water discharge lines 88, a first end of a second boiler water discharge line 88b is connected to the vicinity of the outlet of the heat transfer tube constituting the superheater 23. A second end of the second boiler water discharge line 88b is connected to the condenser casing 41. Among the plurality of boiler water discharge valves 89, a second boiler water discharge valve 89b is provided to the second boiler water discharge line 88b.

A first end of the cooling air line 90 is connected to a discharge port of the cooling air fan 55. A second end of the cooling air line 90 is connected to the main steam line 77, at a position closer to the steam inlet than the shut-off valve 78 and the adjustment valve 79. The cooling air valve 91 is provided to the cooling air line 90.

The control device 100 controls operations of various valves and operations of various pumps and the like described above.

Next, the operation of the steam turbine plant of this embodiment described above will be described.

The compressor 11 of the gas turbine 10 compresses the air A in the atmosphere, and supplies the compressed air A to the combustor 14. In addition, the fuel F from the fuel supply line 65 is also supplied to the combustor 14. In the combustor 14, the fuel F is combusted in the compressed air A to generate high-temperature and high-pressure combustion gas. The combustion gas is sent to the turbine 15 to rotate the turbine rotor 16.

The combustion gas which has rotated the turbine rotor 16 is discharged as the exhaust gas EG from the gas turbine 10, and is released to the outside through the heat recovery steam generator 20. Water from the condenser 40 is supplied to the economizer 21 of the heat recovery steam generator 20 through the supply water line 75. The economizer 21 heats the water by the heat transfer with the exhaust gas EG. The water heated by the economizer 21 is further heated by the evaporator 22 to become steam. The steam is further superheated by the superheater 23, and is supplied as main steam to the steam turbine 30 through the main steam line 77. The steam which has driven the steam turbine 30 returns to water in the condenser 40. The water is supplied again to the economizer 21 from the condenser 40 through the supply water line 75.

The generator rotor 46 is rotated by the rotation of the gas turbine rotor 19 and the steam turbine rotor 31. The generator 45 generates power by the rotation of the generator rotor 46. The power generated by the generator is supplied to the external system 63 through the transformer 61 and the circuit breaker 62.

Figure 2:
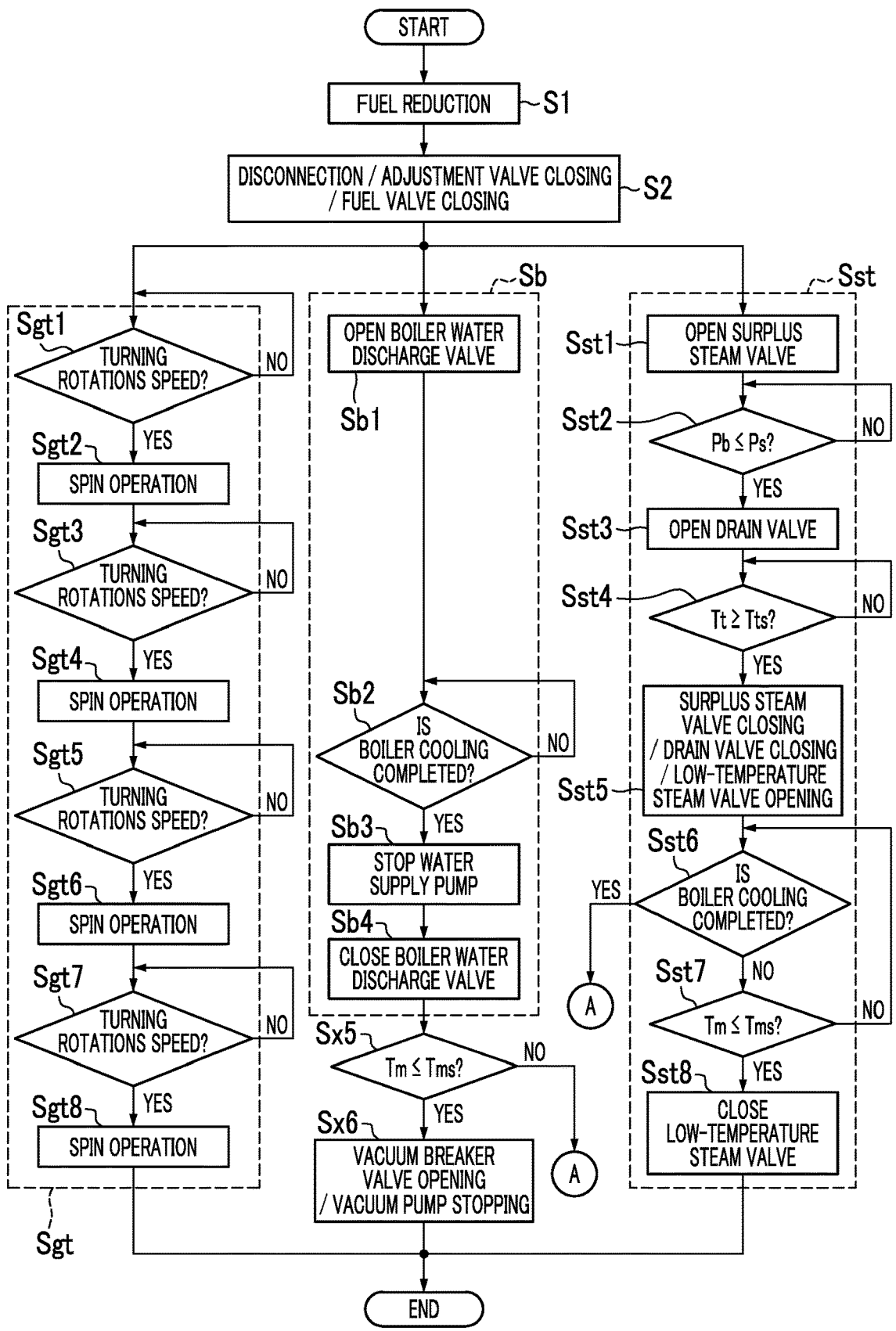
FIG. 2 is a flowchart (part 1) illustrating a stopping procedure of the steam turbine plant in the first embodiment according to the invention.
Figure 3:
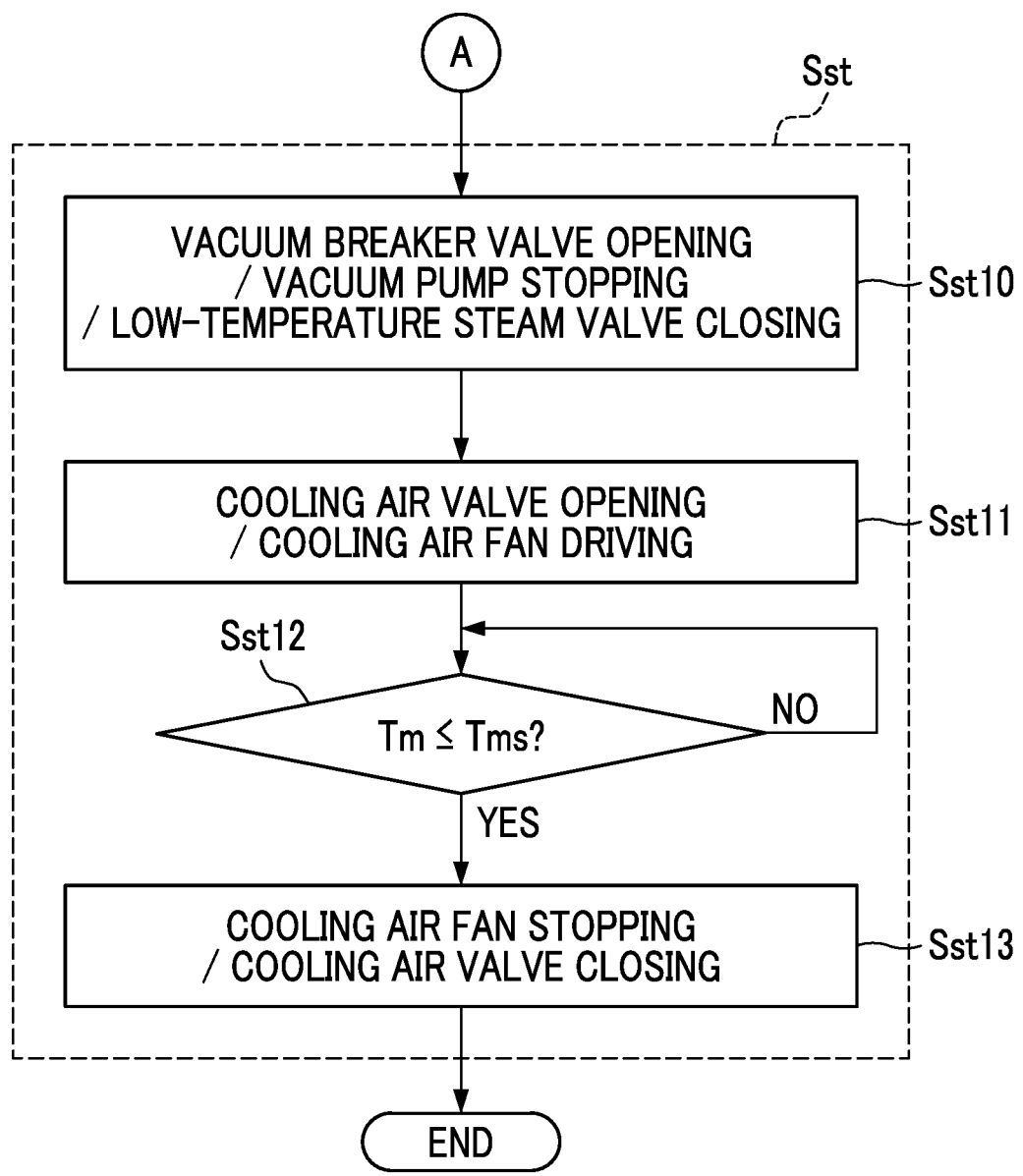
FIG. 3 is a flowchart (part 2) illustrating the stopping procedure of the steam turbine plant in the first embodiment according to the invention.

Next, the operation of the steam turbine plant of this embodiment in the stopping process will be described according to the flowcharts illustrated in FIGS. 2 and 3 and the graph illustrated in FIG. 4.

When the control device 100 receives a plant stop command from the outside, the control device 100 sends an instruction to gradually reduce the opening degree to the fuel valve 66 to gradually decrease the flow rate of the fuel to be supplied to the combustor 14 (S1: fuel reduction step). When the flow rate of the fuel to be supplied to the combustor 14 is gradually decreased, the gas turbine output is gradually reduced. Further, since the thermal energy included in the exhaust gas EG discharged from the gas turbine 10 is also gradually reduced when the flow rate of the fuel to be supplied to the combustor 14 is gradually decreased, the flow rate of the steam generated from the heat recovery steam generator is gradually decreased, and the temperature of the steam is also gradually reduced. Therefore, when the flow rate of the fuel to be supplied to the combustor 14 is gradually decreased, the steam turbine output is also gradually reduced. Thus, when the flow rate of the fuel to be supplied to the combustor 14 is gradually decreased, the generator output is gradually reduced as indicated by the broken line in FIG. 4, and the metal temperature of the steam turbine 30 detected by the metal temperature detector 96 is also gradually reduced as indicated by the solid line in FIG. 4.

Figure 4:
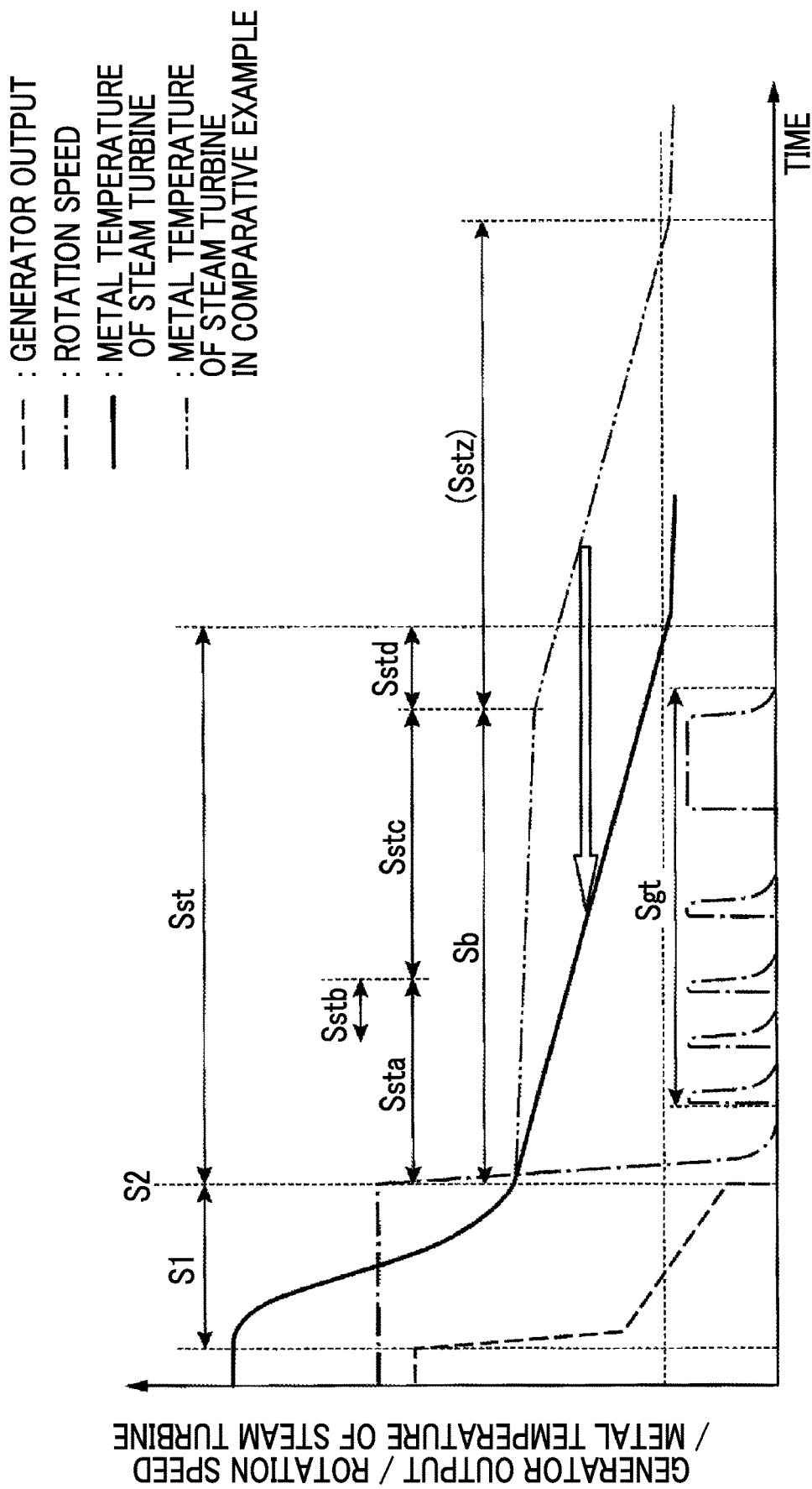
FIG. 4 is a graph illustrating changes in a generator output, a rotor rotation speed, and a metal temperature of a steam turbine over time in the first embodiment according to the invention.

Since the generator 45 is electrically connected to the external system 63 during the fuel reduction step (S1), the generator rotor 46, the gas turbine rotor 19, and the like continue to maintain the rotation speed corresponding to the frequency of the external system 63, as indicated by the one dot chain line in FIG. 4. For example, in a case where the frequency of the external system 63 is 60 Hz, the generator rotor 46, the gas turbine rotor 19, and the like continue to maintain 3600 rpm as the rotation speed corresponding to 60 Hz.

When the generator output detected by the output detector 99 is equal to or less than a predetermined output, the control device 100 sends an opening instruction to the circuit breaker 62 to open the circuit breaker 62, and disconnects the generator 45 from the external system 63. Further, the control device 100 sends a close instruction to the shut-off valve 78 and the adjustment valve 79 to close the shut-off valve 78 and the adjustment valve 79, and sends a close instruction to the fuel valve 66 to close the fuel valve 66 (S2: disconnection/shut-off valve and adjustment valve closing/fuel stopping step). The transmission of the close instruction to the shut-off valve 78 and the adjustment valve 79 in the disconnection/shut-off valve and adjustment valve closing/fuel stopping step (S2) is a main steam stopping step. At this point, the temperature of the first stage stator blade detected by the metal temperature detector 96 is, for example, 300° C.

When the disconnection/shut-off valve and adjustment valve closing/fuel stopping step (S2) is completed, the control device 100 executes a gas turbine cooling step (Sgt), a boiler cooling step (Sb), and a steam turbine cooling step (Sst) in parallel as illustrated in FIG. 4.

In the gas turbine cooling step (Sgt), the control device 100 causes the starter motor 49 to rotate the gas turbine rotor 19 at a rotation speed lower than a rated rotation speed (for example, 3600 rpm). That is, the control device 100 causes the starter motor 49 to intermittently execute a spin operation of the gas turbine 10 a plurality of times. After the disconnection/shut-off valve and adjustment valve closing/fuel stopping step (S2), when the rotation speed of the gas turbine rotor 19 and the like becomes a predetermined turning rotation speed (Sgt1), the control device 100 causes the starter motor 49 to execute the spin operation of the gas turbine 10 (Sgt2). Thereafter, the control device 100 causes the starter motor 49 to stop the spin operation. After the spin operation is stopped, when the rotation speed of the gas turbine rotor 19 and the like becomes the turning rotation speed again (Sgt3), the control device 100 causes the starter motor 49 to execute the spin operation of the gas turbine 10 (Sgt4). Thereafter, the control device 100 causes the starter motor 49 to stop the spin operation. Similarly, the control device 100 determines whether the rotation speed of the gas turbine rotor 19 and the like becomes the turning rotation speed (Sgt5, Sgt7), and causes the starter motor 49 to execute the spin operation (Sgt6, Sgt8).

By executing the spin operation described above, the outside air passes in the compressor casing 13, the combustor 14, and the turbine casing 17 of the gas turbine 10. As a result, the compressor 11, the combustor 14, and the turbine 15 of the gas turbine 10 are cooled by the outside air. In this embodiment, among the plurality of times of the spin operation, the execution time for the first spin operation is set to be shorter than the execution time for the later spin operation. When the outside air passes in the compressor casing 13 and the turbine casing 17, the compressor casing 13, the compressor rotor 12, the turbine casing 17, and the turbine rotor 16 are cooled by the outside air. At this time, due to the difference between the heat capacity of the compressor casing 13 and the heat capacity of the compressor rotor 12, a difference occurs between the amount of shrinkage of the compressor casing 13 and the amount of shrinkage of the compressor rotor 12. Similarly, a difference also occurs between the amount of shrinkage of the turbine casing 17 and the amount of shrinkage of the turbine rotor 16. Therefore, in the cooling process by the outside air, the rotor blade of the compressor rotor 12 may come into contact with the compressor casing 13 and the rotor blade of the turbine rotor 16 may come into contact with the turbine casing 17. Thus, in this embodiment, among the plurality of times of the spin operation, the execution time for the first spin operation is set to be short. Meanwhile, when the compressor 11, the combustor 14, and the turbine 15 of the gas turbine 10 are cooled to some extent by the plurality of times of the spin operation, there is no risk that the rotor blade of the compressor rotor 12 comes into contact with the compressor casing 13 and that the rotor blade of the turbine rotor 16 comes into contact with the turbine casing 17. Therefore, in this embodiment, among the plurality of times of the spin operation, in the later spin operation, the execution time for the spin operation is set to be long in order to accelerate the cooling of the gas turbine 10.

When the starter motor 49 executes the spin operation a predetermined number of times, the control device 100 regards the execution as the completion of the cooling of the gas turbine 10 to end the gas turbine cooling step (Sgt). Temperature detector that detects the temperature of a part of the gas turbine 10 may be provided, the spin operation may be repeatedly executed until the temperature detected by the temperature detector is equal to or less than a predetermined temperature, and the gas turbine cooling step (Sgt) may be ended when the temperature detected by the temperature detector is equal to or less than the predetermined temperature.

The boiler cooling step (Sb) is executed in parallel with the gas turbine cooling step (Sgt) described above. In this embodiment, executing two steps in parallel means executing two steps such that a part of the execution time zone of the first step of two steps overlaps the execution time zone of a second step.

In the boiler cooling step (Sb), the control device 100 causes the water in the condenser casing 41 to flow into the heat transfer tube of the heat recovery steam generator 20. Specifically, while maintaining a state in which the water supply pump 76 is driven, the control device 100 sends an open instruction to the boiler water discharge valve 89 to open the boiler water discharge valve 89 (Sb1: boiler water discharge valve opening step). As a result, the water in the condenser casing 41 is supplied to the heat transfer tube of the heat recovery steam generator 20. The water supplied to the heat transfer tube of the heat recovery steam generator 20 performs heat transfer with the heat transfer tube to cool the heat transfer tube. Thereafter, the water returns to the condenser casing 41 through the boiler water discharge line 88. Specifically, the water supplied to the heat recovery steam generator 20 is supplied from the economizer 21 to the drum 22a of the evaporator 22, and a part of the water returns to the condenser casing 41 through the first boiler water discharge valve 89a and the first boiler water discharge line 88a. In addition, the other part of the water supplied to the drum 22a of the evaporator 22 returns to the condenser casing 41 through the superheater 23, the second boiler water discharge valve 89b, and the second boiler water discharge line 88b.

When the boiler water discharge valve opening step (Sb1) is executed, the control device 100 determines whether the boiler cooling is completed (Sb2: cooling completion determining step). The control device 100 determines whether the boiler cooling is completed based on whether the temperature detected by the heat transfer tube temperature detector 98 is equal to or less than a predetermined temperature, for example. The control device 100 may determine whether the boiler cooling is completed according to whether a predetermined time has passed from the start of the boiler water discharge valve opening step (Sb1) or whether a predetermined flow rate of water has been supplied to the heat recovery steam generator 20 from the start of the boiler water discharge valve opening step (Sb1).

When the control device 100 determines that the boiler cooling is completed, the control device 100 sends a stop instruction to the water supply pump 76, and sends a close instruction to the boiler water discharge valve 89. As a result, the water supply pump 76 is stopped (Sb3: water supply pump stopping step), and the boiler water discharge valve 89 is closed (Sb4: boiler water discharge valve closing step).

In this manner, the boiler cooling step (Sb) is ended.

After the boiler cooling step (Sb) is ended, the control device 100 determines whether a temperature Tm of the first stage stator blade of the steam turbine 30 detected by the metal temperature detector 96 is equal to or less than a predetermined temperature Tms (Sx5: metal temperature determination step). When the control device 100 determines that the temperature Tm of the first stage stator blade is equal to or less than the predetermined temperature Tms, the control device 100 regards the determination as the completion of the cooling of the steam turbine 30 to send an open instruction to the vacuum breaker valve 73 of the condenser 40 and to send a stop instruction to the vacuum pump 71. Here, the predetermined temperature Tms is, for example, 170° C. As a result, the outside air flows into the condenser casing 41 so that the vacuum state inside the condenser casing 41 is broken (Sx6: vacuum break step). Further, when the control device 100 determines that the temperature Tm of the first stage stator blade is not equal to or less than the predetermined temperature Tms in the metal temperature determination step (Sx5), the control device 100 executes the vacuum break step (Sst10) illustrated in FIG. 3.

In the boiler cooling step (Sb), the water in the condenser casing 41 is supplied to the heat transfer tube of the heat recovery steam generator 20 as described above. If the water contains a large amount of oxygen, the inner surface of the heat transfer tube may rust due to oxygen. Therefore, it is necessary to suppress the oxygen concentration in water to be supplied to the heat transfer tube of the heat recovery steam generator 20. Thus, in this embodiment, the outside air is not allowed to flow into the condenser casing 41 during the boiler cooling step (Sb), and after the boiler cooling step (Sb) is completed, the vacuum break step (Sx5) is executed to introduce the outside air into the condenser casing 41.

As illustrated in FIG. 4, the steam turbine cooling step (Sst) includes a surplus steam supply step (Ssta), a low-temperature steam supply step (Sstc), and a drain discharge step (Sstb) executed before the low-temperature steam supply step (Sstc). Further, the steam turbine cooling step (Sst) may include a cooling air supply step (Sstd).

In the steam turbine cooling step (Sst), first, the control device 100 sends an open instruction to the surplus steam valve 81 (Sst1: surplus steam valve opening step). At this point, since the shut-off valve 78 and the adjustment valve 79 are closed, the steam from the heat recovery steam generator 20 does not flow to the steam turbine 30 through the shut-off valve 78 and the adjustment valve 79. The steam from the heat recovery steam generator 20 flows to the steam turbine 30 through the bypass line 80 and the surplus steam valve 81 provided to the bypass line 80, in the main steam line 77. Since the fuel supply to the combustor 14 is stopped at this point, the temperature of the steam generated from the heat recovery steam generator 20 is lower than that before the fuel supply to the combustor 14 is stopped. Moreover, the temperature of the steam is gradually decreased over time. Further, at this point, if the boiler cooling step (Sb) is started, the heat transfer tube of the heat recovery steam generator 20 is cooled, and thus the temperature of the steam generated from the heat recovery steam generator 20 is further decreased. The flow rate of the steam generated from the heat recovery steam generator 20 is gradually decreased over time, and the pressure of the steam is also gradually reduced over time. Thus, the steam turbine 30 is gradually cooled by the steam flowing through the surplus steam valve 81.

After the surplus steam valve opening step (Sst1), the control device 100 determines whether a pressure Pb detected by the steam pressure detector 97 provided to the main steam line 77 is equal to or less than a predetermined pressure Ps (Sst2: steam pressure determination step). When the control device 100 determines that the pressure Pb detected by the steam pressure detector 97 is not equal to or less than the predetermined pressure Ps, the control device 100 continues to supply the steam from the heat recovery steam generator 20 to the steam turbine 30 through the surplus steam valve 81. On the other hand, when the control device 100 determines that the pressure Pb detected by the steam pressure detector 97 is equal to or less than the predetermined pressure Ps, the control device 100 sends an open instruction to the drain valve 85 provided to the drain discharge line 84 (Sst3: drain valve opening step). As a result, the drain valve 85 is opened, and the low-temperature steam from the temperature reducer 52 flows to the condenser 40 through the low-temperature steam line 82 and the drain discharge line 84. The low-temperature steam from the temperature reducer 52 is cooled to become water while heating the low-temperature steam line 82 in the process of passing through the low-temperature steam line 82, and a part of the low-temperature steam becomes water. The water flows to the condenser 40 together with the steam through the drain discharge line 84 as described above.

After the drain valve opening step (Sst3), the control device 100 determines whether a time Tt from the start time point of the drain valve opening step (Sst3) to the current time point has passed a predetermined time Tts or more (Sst4: heating completion determination step). When the time Tt has not passed the predetermined time Tts or more, the control device 100 waits until the time Tt becomes the predetermined time Tts. When the control device 100 determines that the time Tt has passed the predetermined time Tts or more, the control device 100 regards the determination as the low-temperature steam line 82 being sufficiently warmed, to send a close instruction to the surplus steam valve 81 and the drain valve 85 and to send an open instruction to the low-temperature steam valve 83 (Sst5: surplus steam valve closing/drain valve closing/low-temperature steam valve opening step). As a result, the surplus steam valve 81 and the drain valve 85 are closed, while the low-temperature steam valve 83 is opened. By the drain valve being closed and the low-temperature steam valve 83 being opened, the low-temperature steam from the temperature reducer 52 is supplied to the steam turbine 30 through the low-temperature steam line 82. Therefore, the steam turbine 30 is cooled by the low-temperature steam.

The surplus steam supply step (Ssta) is started with the surplus steam valve opening step (Sst1) and is ended with the surplus steam valve closing in Sst5. In addition, the drain discharge step (Sstb) is started with the drain valve opening step (Sst3), and is ended with the drain valve closing in Sst5. Further, the low-temperature steam supply step (Sstc) is started with the low-temperature steam valve opening in Sst5.

Before the low-temperature steam supply step (Sstc) is executed, the drain discharge step (Sstb) is executed, and the low-temperature steam line 82 is warmed with the low-temperature steam. Therefore, it is possible to suppress that a part of the low-temperature steam is liquefied in the process of passing through the low-temperature steam line 82 at the time of the start of the low-temperature steam supply step (Sstc). That is, it is possible to suppress the drain amount of the low-temperature steam flowing into the steam turbine 30 at the time of the start of the low-temperature steam supply step (Sstc).

In the low-temperature steam supply step (Sstc), the low-temperature steam flows into the steam turbine 30 from the steam inlet of the steam turbine 30. In the steam turbine 30, during the operation, among the blades of respective stages, the blades on the upstream side are exposed to the high-temperature steam more than the blades on the downstream side in the steam flow so that the blades on the upstream side have a high temperature. Therefore, as in this embodiment, by causing the low-temperature steam to flow into the steam turbine 30 from the steam inlet of the steam turbine 30, the blade on the upstream side having a high temperature can be efficiently cooled.

After sending the open instruction to the low-temperature steam valve 83, the control device 100 determines whether the boiler cooling is completed (Sst6: cooling completion determining step) as in the above-described cooling completion determining step (Sb2). When the control device 100 determines that the boiler cooling is not completed, the control device 100 determines whether the temperature Tm of the first stage stator blade detected by the metal temperature detector 96 is equal to or less than the predetermined temperature Tms (Sst7: metal temperature determination step) as in the above-described metal temperature determination step (Sx5). When the control device 100 determines that the temperature Tm of the first stage stator blade is not equal to or less than the predetermined temperature Tms, the processing returns to the cooling completion determining step (Sst6). On the other hand, when the control device 100 determines that the temperature Tm of the first stage stator blade is equal to or less than the predetermined temperature Tms, the control device 100 regards the determination as the completion of the cooling of the steam turbine 30 to send a close instruction to the low-temperature steam valve 83 (Sst8: low-temperature steam valve closing step). As a result, the low-temperature steam does not flow to the steam turbine 30, and the low-temperature steam supply step (Sstc) and the steam turbine cooling step (Sst) are ended.

When the control device 100 determines in the cooling completion determining step (Sst6) that the boiler cooling is completed, the control device 100 sends an open instruction to the vacuum breaker valve 73 of the condenser 40 and sends a stop instruction to the vacuum pump 71 as in the above-described vacuum break step (Sx6). Further, the control device 100 sends a close instruction to the low-temperature steam valve 83 (Sst10: vacuum break step (illustrated in FIG. 3)). As a result, the outside air flows into the condenser casing 41 so that the vacuum state inside the condenser casing 41 is broken. Further, the low-temperature steam valve 83 is closed, and the low-temperature steam supply step (Sstc) is ended.

When the vacuum break step (Sst10) is executed, the control device 100 sends an open instruction to the cooling air valve 91, and sends a drive instruction (or a supply instruction) to the cooling air fan 55 (Sst11: cooling air valve opening/cooling air fan driving step). As a result, the cooling air from the cooling air fan 55 is supplied to the steam turbine 30 through the cooling air line 90. Therefore, the steam turbine 30 is cooled by the cooling air. As described above, the cooling air supply step (Sstd) is started with the execution of the cooling air valve opening/cooling air fan driving step (Sst11).

When the cooling air valve opening/cooling air fan driving step (Sst11) is executed, the control device 100 determines whether the temperature Tm of the first stage stator blade detected by the metal temperature detector 96 is equal to or less than the predetermined temperature Tms (Sst12: metal temperature determination step) as in the above-described metal temperature determination step (Sx5, Sst7). When the control device 100 determines that the temperature Tm of the first stage stator blade is not equal to or less than the predetermined temperature Tms, the control device 100 waits until the temperature Tm of the first stage stator blade is equal to or less than the predetermined temperature Tms. On the other hand, when the control device 100 determines that the temperature Tm of the first stage stator blade is equal to or less than the predetermined temperature Tms, the control device 100 regards the determination as the completion of the cooling of the steam turbine 30 to send a stop instruction to the cooling air fan 55 and to send a close instruction to the cooling air valve 91 (Sst13: cooling air fan stopping/cooling air valve closing step). As a result, the cooling air does not flow to the steam turbine 30, and the cooling air supply step (Sstd) and the steam turbine cooling step (Sst) are ended.

In this manner, a stopping process of the steam turbine plant is completed.

Here, before the description of the effects of the steam turbine plant in this embodiment, the steam turbine plant in a comparative example will be described.

In the steam turbine plant of the comparative example, the steam turbine 30 is cooled exclusively by the cooling air from the cooling air fan 55. Thus, in the steam turbine plant of the comparative example, the low-temperature steam line 82 and the bypass line 80 are omitted from steam turbine plant in this embodiment.

Figure 5:
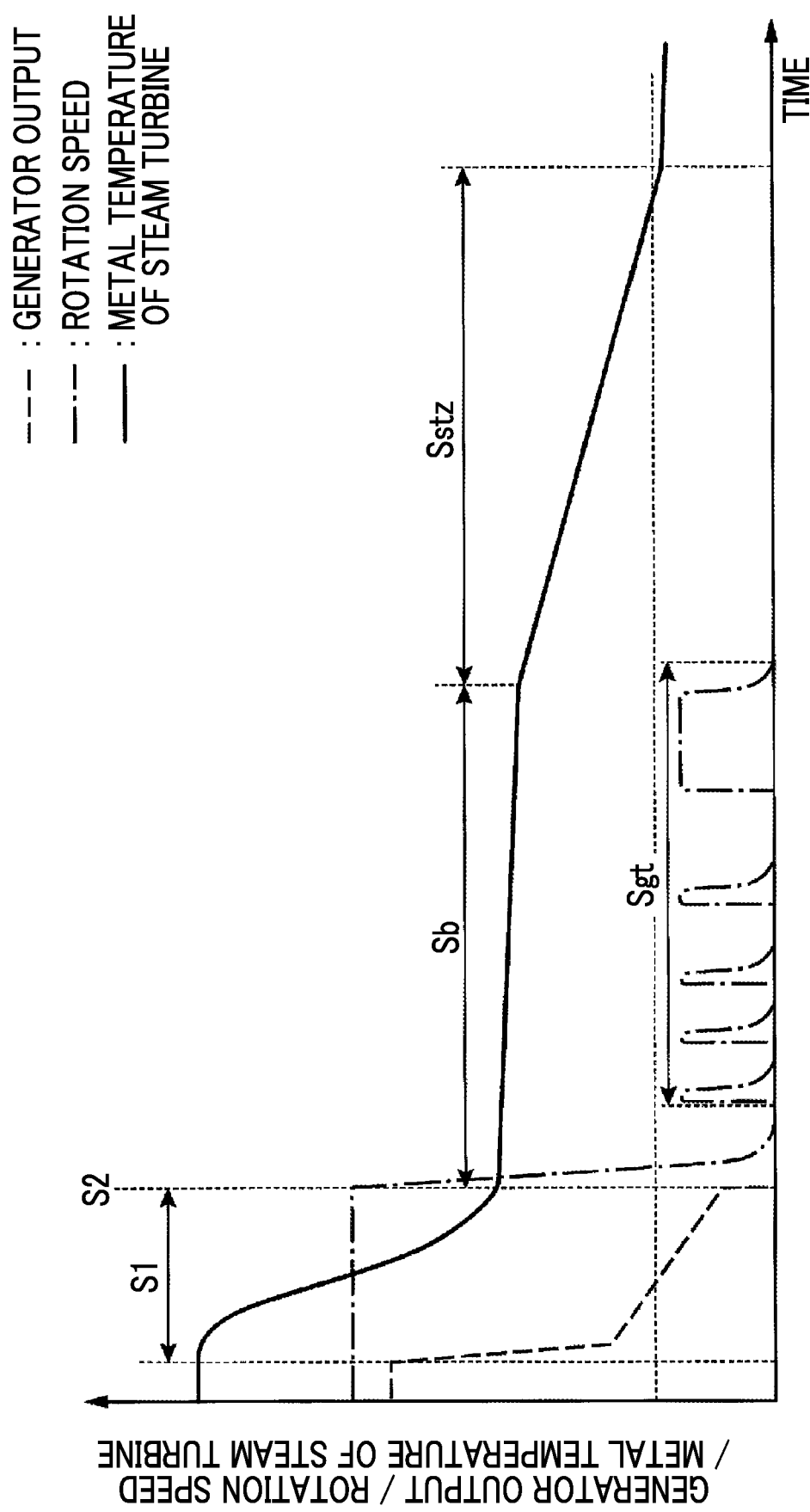
FIG. 5 is a graph illustrating changes in a generator output, a rotor rotation speed, and a metal temperature of a steam turbine over time in a steam turbine plant of a comparative example.

Even in the steam turbine plant of the comparative example, as illustrated in FIG. 5, when the control device of the comparative example receives a plant stop command from the outside, the control device of the comparative example sends an instruction to gradually reduce the opening degree to the fuel valve 66 (S1: fuel reduction step) as in the steam turbine plant of the embodiment.

When the generator output is gradually reduced by gradually decreasing the flow rate of the fuel to be supplied to the combustor 14 and the generator output is equal to or less than a predetermined output, the control device sends an opening instruction to the circuit breaker to open the circuit breaker 62, and disconnects the generator 45 from the external system 63. Further, the control device sends a close instruction to the shut-off valve 78 and the adjustment valve 79 to close the shut-off valve 78 and the adjustment valve 79, and sends a close instruction to the fuel valve 66 to close the fuel valve (S2: disconnection/shut-off valve and adjustment valve closing/fuel stopping step).

When the disconnection/shut-off valve and adjustment valve closing/fuel stopping step (S2) is completed, the control device executes the gas turbine cooling step (Sgt) and the boiler cooling step (Sb) as in the steam turbine plant in this embodiment. However, in the comparative example, a steam turbine cooling step (Sstz) is not executed immediately after the disconnection/shut-off valve and adjustment valve closing/fuel stopping step (S2).

In the steam turbine cooling step (Sstz) of the comparative example, as described above, the steam turbine 30 is cooled exclusively by the cooling air from the cooling air fan 55. When the cooling air flow into the steam turbine 30, the cooling air also flows into the condenser 40. In the boiler cooling step (Sb), as described above, since it is necessary to suppress the oxygen concentration in water to be supplied to the heat transfer tube of the heat recovery steam generator 20, basically air is not allowed to flow into the condenser casing 41 during the boiler cooling step (Sb). Thus, in the comparative example, the vacuum break step for the condenser 40 is executed after the boiler cooling step (Sb) is completed, and then the steam turbine cooling step (Sstz) is executed.

On the other hand, in the surplus steam supply step (Ssta) and the low-temperature steam supply step (Sstc) of the steam turbine cooling step (Sst) in this embodiment, steam is supplied to the steam turbine 30, and the steam turbine 30 is cooled by the steam. Therefore, in the execution of the surplus steam supply step (Ssta) and the low-temperature steam supply step (Sstc), air does not flow into the condenser casing 41. Thus, in this embodiment, as illustrated in FIG. 4, the surplus steam supply step (Ssta) and the low-temperature steam supply step (Sstc) of the steam turbine cooling step (Sst) are executed in parallel with the boiler cooling step (Sb). Therefore, in this embodiment, the cooling start timing of the steam turbine 30 can be accelerated, and as a result, the cooling completion timing of the steam turbine 30 and the steam turbine plant can be accelerated.

The heat capacity of steam is greater than that of air. Therefore, the temperature of the steam turbine 30 is high, and in a stage where the difference between the temperature of the steam turbine 30 and the temperature of the low-temperature steam is large, it is possible to increase the temperature drop of the steam turbine 30 per unit time, although the temperature drop depends on the flow rate of the low-temperature steam in this embodiment. Thus, in this embodiment, from this point of view, the cooling completion timing of the steam turbine 30 can be accelerated.

In this embodiment, the temperature of the steam turbine 30 is reduced by the supply of the low-temperature steam, and in a stage where the difference between the temperature of the steam turbine 30 and the temperature of the low-temperature steam is small, if the boiler cooling step (Sb) has been completed, the steam turbine 30 is cooled by the cooling air of which the temperature difference with respect to the temperature of the steam turbine 30 is large. Therefore, in this embodiment, if the boiler cooling step (Sb) has been completed, it is possible to increase the temperature drop of the steam turbine 30 per unit time after the difference between the temperature of the steam turbine 30 and the temperature of the low-temperature steam becomes small. Thus, in this embodiment, from this point of view, the cooling completion timing of the steam turbine 30 can be accelerated.

In this embodiment, in the steam turbine cooling step (Sst), the low-temperature steam supply step (Sstc) is executed after the surplus steam supply step (Ssta) is executed. In the surplus steam supply step (Ssta), the steam generated by the superheater 23 is supplied to the steam turbine 30 as before the disconnection/shut-off valve and adjustment valve closing/fuel stopping step (S2). Therefore, in this embodiment, the temperature of the steam supplied to the steam turbine 30 is almost unchanged immediately before and after the disconnection/shut-off valve and adjustment valve closing/fuel stopping step (S2). Thus, in this embodiment, it is possible to minimize the thermal shock given to the steam turbine 30 immediately after the start of the steam turbine cooling step (Sst).

In order to realize the low-temperature steam supply step (Sstc), the steam turbine 30 of this embodiment includes the auxiliary boiler 51, the temperature reducer 52, and the low-temperature steam line 82. If the existing steam turbine plant includes the auxiliary boiler 51, the temperature reducer 52, and the shaft seal steam line 86 that guides the low-temperature steam from the temperature reducer 52 to the shaft seal device 39 of the steam turbine 30, the low-temperature steam supply step (Sstc) can be realized by providing the low-temperature steam line 82 that branches from the shaft seal steam line 86 and is connected to the main steam line 77. Thus, if the existing steam turbine plant is a plant as described above, it is possible to realize the low-temperature steam supply step (Sstc) while suppressing the remodeling cost for the equipment.

Second Embodiment

A second embodiment of the steam turbine plant according to the invention will be described with reference to FIGS. 6 and 7.

Figure 6:
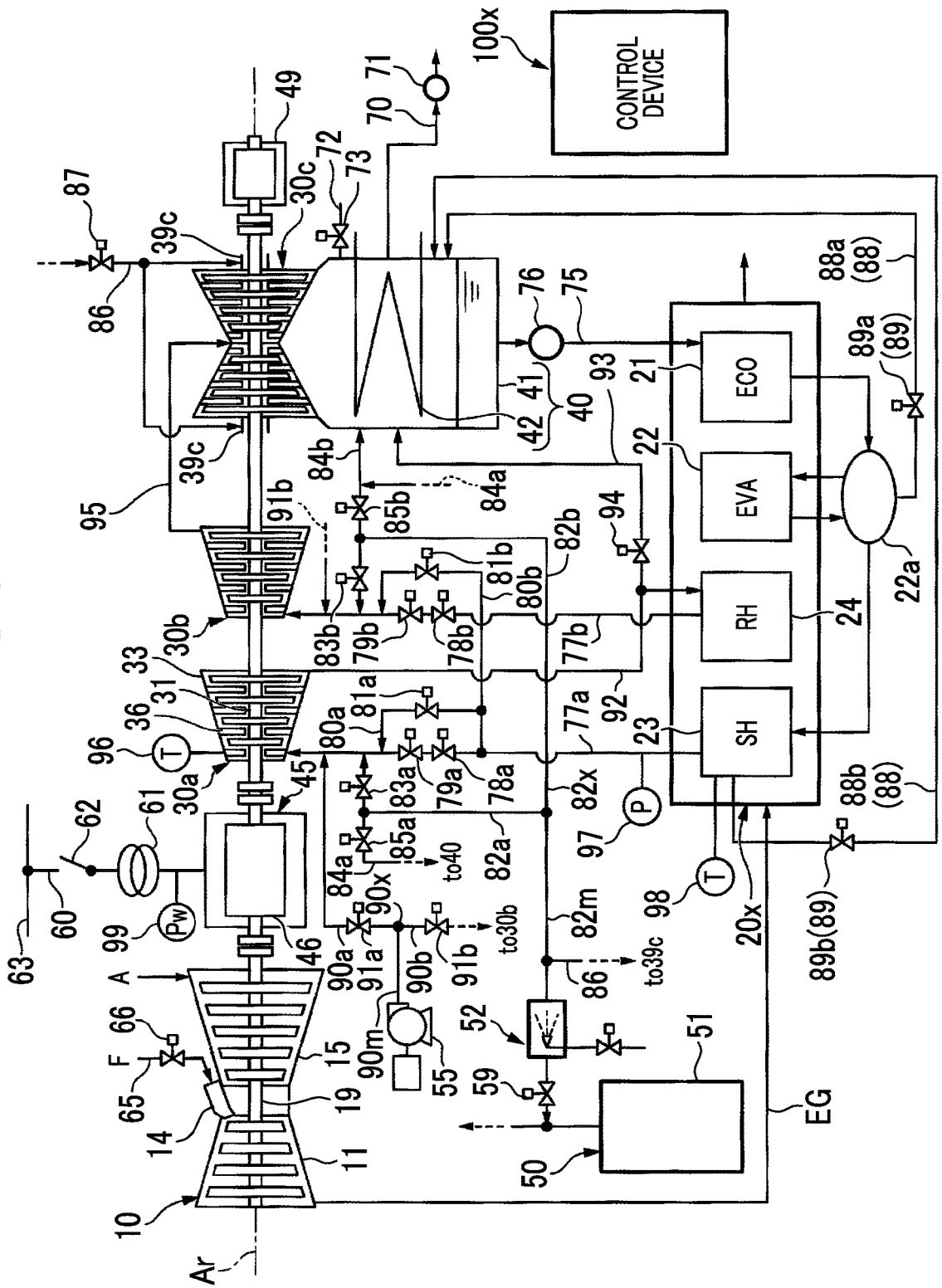
FIG. 6 is a system diagram of a steam turbine plant in a second embodiment according to the invention.
Figure 7:
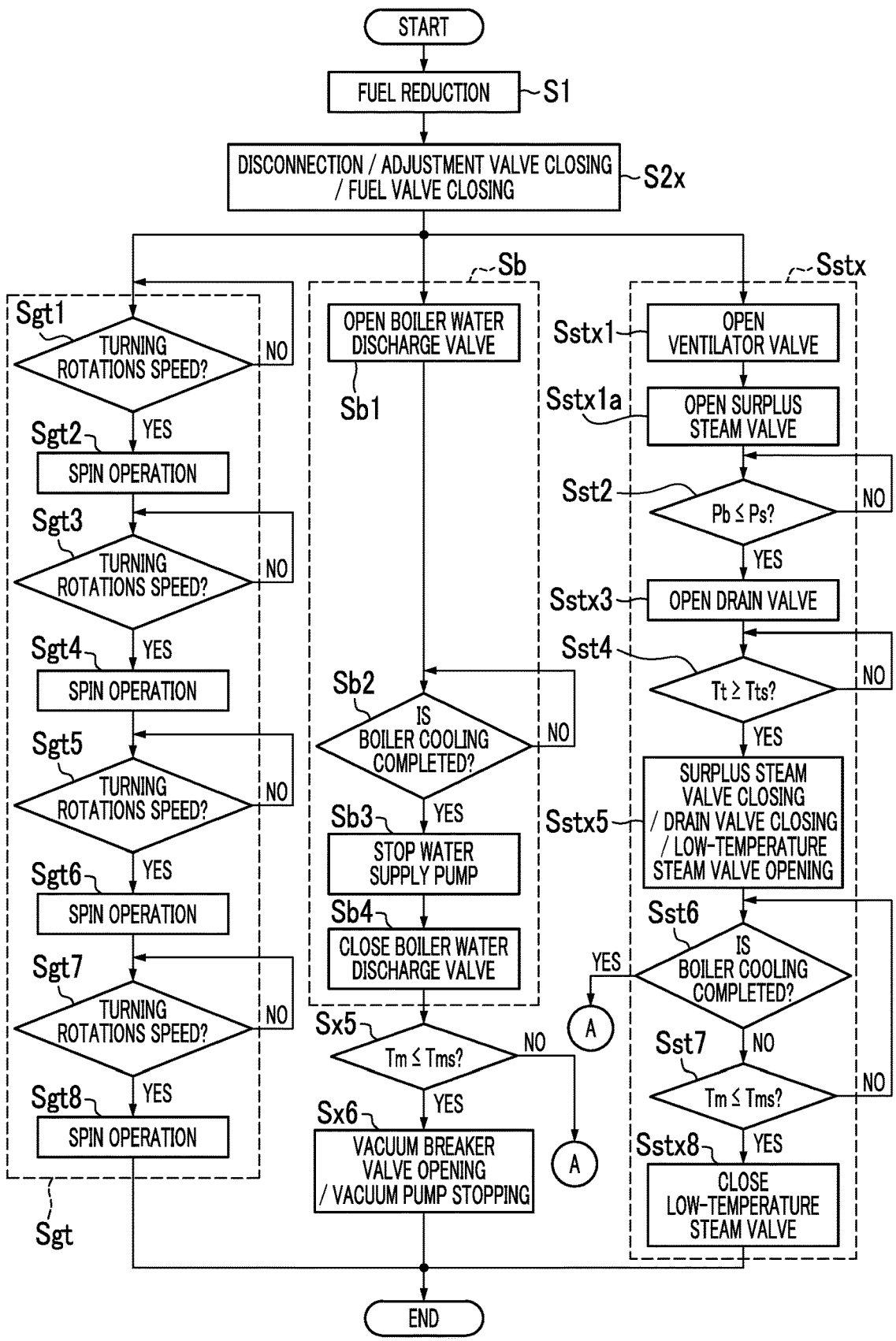
FIG. 7 is a flowchart (part 1) illustrating a stopping procedure of the steam turbine plant in the second embodiment according to the invention.

As with the steam turbine plant of the first embodiment, the steam turbine plant of this embodiment includes the gas turbine 10, a heat recovery steam generator 20x that generates steam using exhaust gas EG from the gas turbine 10, a steam turbine that is driven by the steam from the heat recovery steam generator 20x, the condenser 40 that returns the steam from the steam turbine to water, the water supply pump 76 that sends the water in the condenser 40 to the heat recovery steam generator 20x, the generator 45, and the starter motor 49, as illustrated in FIG. 6. Thus, as with the steam turbine plant of the first embodiment, the steam turbine plant of this embodiment is a combined cycle plant.

The gas turbine 10 of this embodiment is the same as the gas turbine 10 of the first embodiment. Thus, the gas turbine 10 of this embodiment also includes the compressor 11, the combustor 14, and the turbine 15. Also in this embodiment, the fuel supply line 65 that supplies the fuel F to the combustor 14 is connected to the combustor 14. The fuel valve 66 that adjusts the flow rate of the fuel F to be supplied to the combustor 14 is provided to the fuel supply line 65.

The steam turbine plant of this embodiment includes a high-pressure steam turbine 30a, a medium-pressure steam turbine 30b, and a low-pressure steam turbine 30c, as the steam turbine. As with the steam turbine 30 of the first embodiment, each of the high-pressure steam turbine 30a, the medium-pressure steam turbine 30b, and the low-pressure steam turbine 30c has the steam turbine rotor 31, the steam turbine casing 34, the plurality of stator blade rows 36, and a shaft seal device. In FIG. 6, only a shaft seal device 39c of the low-pressure steam turbine 30c is illustrated, and the shaft seal devices of the high-pressure steam turbine 30a and the medium-pressure steam turbine 30b are omitted. The metal temperature detector 96 that detects the temperature of the first stage stator blade is provided to the first stage stator blade of the high-pressure steam turbine 30a.

As with the heat recovery steam generator 20 of the first embodiment, the heat recovery steam generator 20x of this embodiment has the economizer 21, the evaporator 22, and the superheater 23. The heat recovery steam generator 20x of this embodiment further has a reheater 24 that heats the steam discharged from the medium-pressure steam turbine 30b. Each of the economizer 21, the evaporator 22, the reheater 24, and the superheater 23 has a heat transfer tube through which water or steam passes and which is for heat transfer between the water or steam and the exhaust gas EG. As with the evaporator 22 of the first embodiment, the evaporator 22 of this embodiment has the drum 22a in addition to the heat transfer tube. The heat transfer tube temperature detector 98 that detects the temperature of the heat transfer tube is provided in the vicinity of the outlet of the heat transfer tube of the superheater 23. Further, the heat recovery steam generator 20x includes one or more booster pumps (not illustrated) that boost the pressure of the water supplied to the economizer 21.

The condenser 40 of this embodiment is the same as the condenser 40 of the first embodiment. Thus, the condenser 40 of this embodiment also has a heat transfer tube through which a cooling medium such as water flows, and the condenser casing 41 that covers the heat transfer tube. The steam from the low-pressure steam turbine 30c flows into the condenser casing 41, and is cooled by the heat transfer with the cooling medium in the heat transfer tube to become water. As with the condenser 40 of the first embodiment, the exhaust line 70 is provided to the condenser casing 41. The vacuum pump 71 that suctions gas in the condenser casing 41 is provided to the exhaust line 70. The outside air line 72 that guides the outside air into the condenser casing 41 is further provided to the condenser casing 41. The vacuum breaker valve 73 is provided to the outside air line 72.

The generator 45 of this embodiment is the same as the generator 45 of the first embodiment. Thus, the generator 45 of this embodiment also has the generator rotor 46 and the generator casing 47. As in the first embodiment, the generator 45 is electrically connected to the external system 63 by the connection line 60. The transformer 61 and the circuit breaker 62 are provided to the connection line 60. Further, the power detector (output detector 99) is provided to the connection line 60 to be at a position closer to the generator 45 than the circuit breaker 62.

The gas turbine rotor 19, the steam turbine rotor 31 of each of the steam turbines 30a, 30b, and 30c, and the generator rotor 46 are positioned on the same axis Ar, and are mechanically connected to each other. Thus, as in the first embodiment, the combined cycle plant of this embodiment is also called a single-shaft combined cycle plant. The starter motor 49 rotates these rotors around the axis Ar.

As with the steam turbine plant of the first embodiment, the steam turbine plant of this embodiment includes the low-temperature steam generation source 50, the cooling air fan 55, and a control device 100x. The low-temperature steam generation source 50 has the auxiliary boiler 51 that generates steam independently of the heat recovery steam generator 20x, the pressure control valve 59 that reduces the pressure of the steam generated by the auxiliary boiler 51, and the temperature reducer 52 that lowers the temperature of the steam generated by the auxiliary boiler 51. The temperature reducer 52 has the nozzle 53 that sprays water for temperature reduction to the steam generated by the auxiliary boiler 51, and the temperature reduction water adjustment valve 54 that adjusts the flow rate of the water for temperature reduction to be supplied to the nozzle 53.

The steam turbine plant of this embodiment further includes the supply water line 75, a first main steam line 77a, a second main steam line 77b, a first shut-off valve 78a, a second shut-off valve 78b, a first adjustment valve (main steam adjustment valve) 79a, a second adjustment valve (main steam adjustment valve) 79b, a first surplus steam bypass line 80a (hereinafter, simply referred to as a first bypass line 80a), a second surplus steam bypass line 80b (hereinafter, simply referred to as a second bypass line 80b), a first surplus steam bypass valve 81a (hereinafter, simply referred to as a first surplus steam valve 81a), a second surplus steam bypass valve 81b (hereinafter, simply referred to as a second surplus steam valve 81b), a low-temperature steam line 82x, a first low-temperature steam valve 83a, a second low-temperature steam valve 83b, a first drain discharge line 84a, a second drain discharge line 84b, a first drain valve 85a, a second drain valve 85b, the shaft seal steam line 86, the shaft seal steam valve 87, the plurality of boiler water discharge lines 88, the plurality of boiler water discharge valves 89, a cooling air line 90x, a first cooling air valve 91a, a second cooling air valve 91b, a high-pressure steam recovery line 92, a ventilator line 93, a ventilator valve 94, and a low-pressure steam line 95.

The supply water line 75 connects the condenser casing 41 and the economizer 21. The water supply pump 76 is provided to the supply water line 75. The first main steam line 77a connects the superheater 23 and a steam inlet of the high-pressure steam turbine 30a. The first shut-off valve 78a and the first adjustment valve 79a are provided to the first main steam line 77a. Further, the steam pressure detector 97 that detects the pressure of the steam is provided to the first main steam line 77a so as to be closer to the superheater 23 than the first shut-off valve 78a and the first adjustment valve 79a. A first end of the first bypass line 80a is connected to the first main steam line 77a, at a position closer to the superheater 23 than the first shut-off valve 78a and the first adjustment valve 79a. Further, a second end of the first bypass line 80a is connected to the first main steam line 77a, at a position closer to the steam inlet of the high-pressure steam turbine 30a than the first shut-off valve 78a and the first adjustment valve 79a. The first surplus steam valve 81a is provided to the first bypass line 80a.

The high-pressure steam recovery line 92 connects a steam outlet of the high-pressure steam turbine 30a and a steam inlet of the reheater 24. A first end of the ventilator line 93 is connected to the high-pressure steam recovery line 92. A second end of the ventilator line 93 is connected to the condenser casing 41. The ventilator valve 94 is provided to the ventilator line 93. The second main steam line 77b connects a steam outlet of the reheater 24 and a steam inlet of the medium-pressure steam turbine 30b. The second shut-off valve 78b and the second adjustment valve 79b are provided to the second main steam line 77b. A first end of the second bypass line 80b is connected to the first main steam line 77a, at a position closer to the superheater 23 than the first shut-off valve 78a and the first adjustment valve 79a. Further, a second end of the second bypass line 80b is connected to the second main steam line 77b, at a position closer to the steam inlet of the medium-pressure steam turbine 30b than the second shut-off valve 78b and the second adjustment valve 79b. The second surplus steam valve 81b is provided to the second bypass line 80b.

The low-pressure steam line 95 connects a steam outlet of the medium-pressure steam turbine 30b and a steam inlet of the low-pressure steam turbine 30c.

The low-temperature steam line 82x has a main low-temperature steam line 82m, a first low-temperature steam line 82a, and a second low-temperature steam line 82b. The main low-temperature steam line 82m is connected to the temperature reducer 52. A first end of the first low-temperature steam line 82a is connected to the main low-temperature steam line 82m. A second end of the first low-temperature steam line 82a is connected to the first main steam line 77a, at a position closer to the steam inlet of the high-pressure steam turbine 30a than the first shut-off valve 78a and the first adjustment valve 79a. The first low-temperature steam valve 83a is provided to the first low-temperature steam line 82a. A first end of the first drain discharge line 84a is connected to the first low-temperature steam line 82a, at a position closer to the temperature reducer 52 than the first low-temperature steam valve 83a. A second end of the first drain discharge line 84a is connected to the condenser casing 41. The first drain valve 85a is provided to the first drain discharge line 84a. A first end of the second low-temperature steam line 82b is connected to the main low-temperature steam line 82m. A second end of the second low-temperature steam line 82b is connected to the second main steam line 77b, at a position closer to the steam inlet of the medium-pressure steam turbine 30b than the second shut-off valve 78b and the second adjustment valve 79b. The second low-temperature steam valve 83b is provided to the second low-temperature steam line 82b. A first end of the second drain discharge line 84b is connected to the second low-temperature steam line 82b, at a position closer to the temperature reducer than the second low-temperature steam valve 83b. A second end of the second drain discharge line 84b is connected to the condenser casing 41. The second drain valve 85b is provided to the second drain discharge line 84b.

A first end of the shaft seal steam line 86 is connected to the main low-temperature steam line 82m. A second end of the shaft seal steam line 86 is connected to the shaft seal device 39c of the low-pressure steam turbine 30c. The shaft seal steam valve 87 is provided to the shaft seal steam line 86. As with the boiler water discharge line 88 of the first embodiment, a first end of the boiler water discharge line 88b is connected to the vicinity of the outlet of the heat transfer tube constituting the superheater 23.

Among the plurality of boiler water discharge lines 88, the first end of the first boiler water discharge line 88a is connected to the drum 22a of the evaporator 22. The second end of the first boiler water discharge line 88a is connected to the condenser casing 41. Among the plurality of boiler water discharge valves 89, the first boiler water discharge valve 89a is provided to the first boiler water discharge line 88a. Among the plurality of boiler water discharge lines 88, the first end of the second boiler water discharge line 88b is connected to the vicinity of the outlet of the heat transfer tube constituting the superheater 23. The second end of the second boiler water discharge line 88b is connected to the condenser casing 41. Among the plurality of boiler water discharge valves 89, the second boiler water discharge valve 89b is provided to the second boiler water discharge line 88b.

The cooling air line 90x has a main cooling air line 90m, a first cooling air line 90a, and a second cooling air line 90b. The main cooling air line 90m is connected to the discharge port of the cooling air fan 55. A first end of the first cooling air line 90a is connected to the main cooling air line 90m. A second end of the first cooling air line 90a is connected to the first main steam line 77a, at a position closer to the steam inlet of the high-pressure steam turbine 30a than the first shut-off valve 78a and the first adjustment valve 79a. The first cooling air valve 91a is provided to the first cooling air line 90a. A first end of the second cooling air line 90b is connected to the main cooling air line 90m. A second end of the second cooling air line 90b is connected to the second main steam line 77b, at a position closer to the steam inlet of the medium-pressure steam turbine 30b than the second shut-off valve 78b and the second adjustment valve 79b. The second cooling air valve 91b is provided to the second cooling air line 90b.

The control device 100x controls operations of various valves and operations of various pumps and the like described above.

Next, the operation of the steam turbine plant of this embodiment described above will be described.

The gas turbine 10 of this embodiment also operates in the same manner as the gas turbine 10 of the first embodiment. The combustion gas which has rotated the turbine rotor 16 of the gas turbine 10 is discharged as the exhaust gas EG from the gas turbine 10, and is released to the outside through the heat recovery steam generator 20x. Water from the condenser 40 is supplied to the economizer 21 of the heat recovery steam generator 20x through the supply water line 75. The economizer 21 heats the water by the heat transfer with the exhaust gas EG. The water heated by the economizer 21 is further heated by the evaporator 22 to become steam. The steam is further superheated by the superheater 23, and is supplied as high-pressure steam to the high-pressure steam turbine 30a through the first main steam line 77a. The steam which has driven the high-pressure steam turbine 30a flows to the reheater 24 through the high-pressure steam recovery line 92. The steam having flowed to the reheater 24 is heated by the reheater 24. The steam heated by the reheater 24 is supplied as medium-pressure steam (or reheat steam) to the medium-pressure steam turbine 30b through the second main steam line 77b. The steam which has driven the medium-pressure steam turbine 30b is supplied to the low-pressure steam turbine 30c through the low-pressure steam line 95. The steam which has driven the low-pressure steam turbine 30c returns to water in the condenser 40. The water is supplied again to the economizer 21 from the condenser 40 through the supply water line 75.

The generator rotor 46 is rotated by the rotation of the gas turbine rotor 19 and the steam turbine rotor 31. The generator 45 generates power by the rotation of the generator rotor 46. The power generated by the generator is supplied to the external system 63 through the transformer 61 and the circuit breaker 62.

Figure 8:
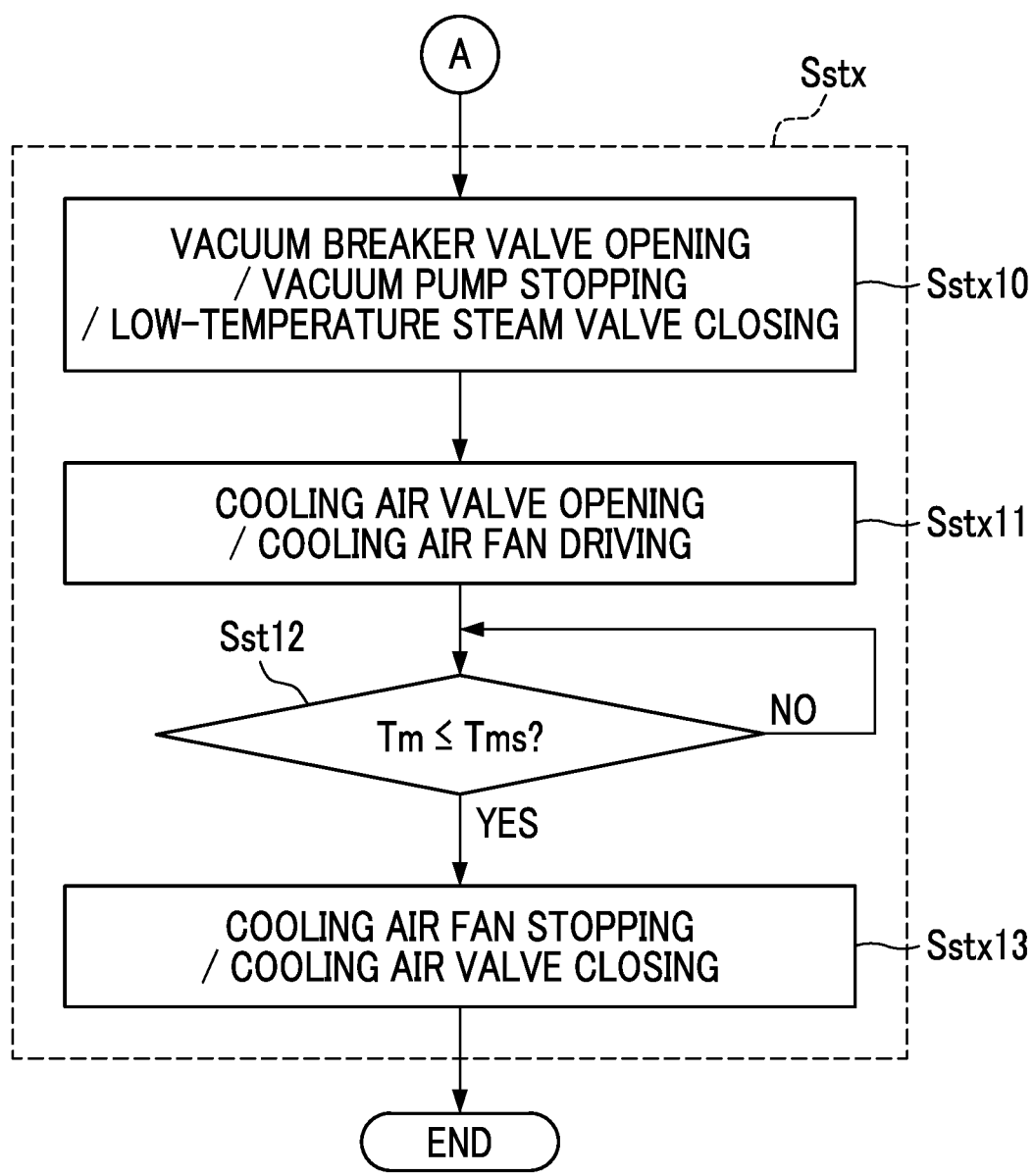
FIG. 8 is a flowchart (part 2) illustrating the stopping procedure of the steam turbine plant in the second embodiment according to the invention.

Next, the operation of the steam turbine plant of this embodiment in the stopping process will be described according to the flowcharts illustrated in FIGS. 7 and 8.

Also in this embodiment, when the control device 100x receives a plant stop command from the outside, the control device 100x sends an instruction to gradually reduce the opening degree to the fuel valve 66 to gradually decrease the flow rate of the fuel to be supplied to the combustor 14 (S1: fuel reduction step). Then, the control device 100x executes a disconnection/shut-off valve and adjustment valve closing/fuel stopping step (S2x) as in the first embodiment. However, in the disconnection/shut-off valve and adjustment valve closing/fuel stopping step (S2x), the control device 100x sends a close instruction to the first shut-off valve 78a, the first adjustment valve 79a, the second shut-off valve 78b, and the second adjustment valve 79b to close the first shut-off valve 78a, the first adjustment valve 79a, the second shut-off valve 78b, and the second adjustment valve 79b.

When the disconnection/shut-off valve and adjustment valve closing/fuel stopping step (S2x) is completed, the control device 100x executes the gas turbine cooling step (Sgt), the boiler cooling step (Sb), and a steam turbine cooling step (Sstx) in parallel as in the first embodiment. The gas turbine cooling step (Sgt) of this embodiment is the same as the gas turbine cooling step (Sgt) of the first embodiment. Further, the boiler cooling step (Sb) of this embodiment is the same as the boiler cooling step (Sb) of the first embodiment. However, the steam turbine cooling step (Sstx) of this embodiment is slightly different from the steam turbine cooling step (Sst) of the first embodiment. Thus, in the following, the description of the gas turbine cooling step (Sgt) and the boiler cooling step (Sb) of this embodiment is omitted, and the steam turbine cooling step (Sstx) of this embodiment will be described.

As in the first embodiment, the steam turbine cooling step (Sstx) of this embodiment includes the surplus steam supply step, the low-temperature steam supply step, and the drain discharge step executed before the low-temperature steam supply step. Further, the steam turbine cooling step (Sstx) of this embodiment may also include a cooling air supply step.

In the steam turbine cooling step (Sstx), first, the control device 100x sends an open instruction to the ventilator valve 94 (Sstx1: ventilator valve opening step) unlike the first embodiment. As a result, the ventilator valve 94 is opened so that the steam outlet of the high-pressure steam turbine 30a and the condenser casing 41 communicate with each other through the high-pressure steam recovery line 92 and the ventilator line 93. Next, the control device 100x executes the surplus steam valve opening step (Sstx1a) same as the surplus steam valve opening step (Sst1) of the first embodiment. However, in the surplus steam valve opening step (Sstx1a), the control device 100x sends an open instruction to the first surplus steam valve 81a and the second surplus steam valve 81b. As a result, a part of the steam from the superheater 23 flows to the high-pressure steam turbine 30a through the first bypass line 80a, and the high-pressure steam turbine 30a is cooled by the steam. The steam having flowed to the high-pressure steam turbine 30a is discharged to the condenser 40 through the high-pressure steam recovery line 92 and the ventilator line 93. Further, the other part of the steam from the superheater 23 flows to the medium-pressure steam turbine 30b through the second bypass line 80b, and the medium-pressure steam turbine 30b is cooled by the steam. The steam having flowed to the medium-pressure steam turbine 30b flows to the low-pressure steam turbine 30c through the low-pressure steam line 95, and the low-pressure steam turbine 30c is cooled by the steam.

After the surplus steam valve opening step (Sstx1a), the control device 100x executes the steam pressure determination step (Sst2) as in the first embodiment. In the steam pressure determination step (Sst2), when the control device 100x determines that the pressure Pb detected by the steam pressure detector 97 is equal to or less than the predetermined pressure Ps, the control device 100x executes a drain valve opening step (Sstx3) same as the drain valve opening step (Sst3) of the first embodiment. However, in the drain valve opening step (Sstx3), the control device 100x sends an open instruction to the first drain valve 85a and the second drain valve 85b. As a result, a part of the low-temperature steam from the temperature reducer 52 flows to the condenser 40 through the first low-temperature steam line 82a and the first drain discharge line 84a. In this manner, the first low-temperature steam line 82a is warmed with the low-temperature steam. Further, the other part of the low-temperature steam from the temperature reducer 52 flows to the condenser 40 through the second low-temperature steam line 82b and the second drain discharge line 84b. In this manner, the second low-temperature steam line 82b is warmed with the low-temperature steam.

After the drain valve opening step (Sstx3), the control device 100x executes the heating completion determination step (Sst4) as in the first embodiment. When the control device 100x determines in the heating completion determination step (Sst4) that the time Tt from the start time point of the drain valve opening step (Sstx3) to the current time point has passed the predetermined time Tts or more, the control device 100x regards the determination as the first low-temperature steam line 82a and the second low-temperature steam line 82b being sufficiently warmed to execute a surplus steam valve closing/drain valve closing/low-temperature steam valve opening step (Sstx5) same as the surplus steam valve closing/drain valve closing/low-temperature steam valve opening step (Sst5) of the first embodiment. However, in the surplus steam valve closing/drain valve closing/low-temperature steam valve opening step (Sstx5), the control device 100x sends a closing command to the first surplus steam valve 81a, the second surplus steam valve 81b, the first drain valve 85a, and the second drain valve 85b, and sends an open instruction to the first low-temperature steam valve 83a and the second low-temperature steam valve 83b. As a result, a part of the low-temperature steam from the temperature reducer 52 is supplied to the high-pressure steam turbine 30a through the first low-temperature steam line 82a. Therefore, the high-pressure steam turbine 30a is cooled by the low-temperature steam. In addition, the other part of the low-temperature steam from the temperature reducer 52 is supplied to the medium-pressure steam turbine 30b through the second low-temperature steam line 82b. Therefore, the medium-pressure steam turbine 30b is cooled by the low-temperature steam. The low-temperature steam supplied to the medium-pressure steam turbine 30b flows to the low-pressure steam turbine 30c through the low-pressure steam line 95. Therefore, the low-pressure steam turbine 30c is cooled by the low-temperature steam.

The surplus steam supply step of this embodiment is started with the ventilator valve opening step (Sstx1), and is ended with the closing of the first surplus steam valve 81a and the second surplus steam valve 81b in Sstx5. In addition, the drain discharge step of this embodiment is started with the drain valve opening step (Sstx3), and is ended with the closing of the first drain valve 85a and the second drain valve 85b in Sstx5. Further, the low-temperature steam supply step is started with the opening of the first low-temperature steam valve 83a and the second low-temperature steam valve 83b in Sstx5.

After sending an open instruction to the first low-temperature steam valve 83a and the second low-temperature steam valve 83b, the control device 100x executes the cooling completion determining step (Sst6) as with the cooling completion determining step (Sst6) of the first embodiment. When the control device 100x determines in the cooling completion determining step (Sst6) that the boiler cooling is not completed, the control device 100x executes the metal temperature determination step (Sst7) as with the metal temperature determination step (Sst7) of the first embodiment. When the control device 100x determines in the metal temperature determination step (Sst7) that the temperature Tm of the first stage stator blade detected by the metal temperature detector 96 is equal to or less than the predetermined temperature Tms, the control device 100x returns to the cooling completion determining step (Sst6). On the other hand, when the control device 100x determines that the temperature Tm of the first stage stator blade is equal to or less than the predetermined temperature Tms, the control device 100x regards the determination as the completion of the cooling of each of the steam turbines 30a, 30b, and 30c to execute a low-temperature steam valve closing step (Sstx8) same as the low-temperature steam valve closing step (Sst8) of the first embodiment. However, in the low-temperature steam valve closing step (Sstx8), the control device 100x sends a close instruction to the first low-temperature steam valve 83a and the second low-temperature steam valve 83b. As a result, the low-temperature steam does not flow to each of the steam turbines 30a, 30b, and 30c, and the low-temperature steam supply step and the steam turbine cooling step (Sstx) are ended.

When the control device 100x determines in the cooling completion determining step (Sst6) that the boiler cooling is completed, the control device 100x executes a vacuum break step (Sstx10 (illustrated in FIG. 8)) same as the vacuum break step (Sst10) of the first embodiment. However, in the vacuum break step (Sstx10), the control device 100x sends an open instruction to the vacuum breaker valve 73 of the condenser 40, sends a stop instruction to the vacuum pump 71, and sends a close instruction to the first low-temperature steam valve 83a and the second low-temperature steam valve 83b. As a result, the outside air flows into the condenser casing 41 so that the vacuum state inside the condenser casing 41 is broken. Further, the first low-temperature steam valve 83a and the second low-temperature steam valve 83b are closed, and the low-temperature steam supply step is ended.

When the vacuum break step (Sstx10) is executed, the control device 100x executes a cooling air valve opening/cooling air fan driving step (Sstx11) same as the cooling air valve opening/cooling air fan driving step (Sst11) of the first embodiment. However, in the cooling air valve opening/cooling air fan driving step (Sstx11), the control device 100x sends an open instruction to the first cooling air valve 91a and the second cooling air valve 91b. As a result, a part of the cooling air from the cooling air fan 55 is supplied to the high-pressure steam turbine 30a through the first cooling air line 90a. Therefore, the high-pressure steam turbine 30a is cooled by the cooling air. In addition, the other part of the cooling air from the cooling air fan 55 is supplied to the medium-pressure steam turbine 30b through the second cooling air line 90b. Therefore, the medium-pressure steam turbine 30b is cooled by the cooling air. The cooling air supplied to the medium-pressure steam turbine 30b flows from the medium-pressure steam turbine 30b to the low-pressure steam turbine 30c through the low-pressure steam line 95. The low-pressure steam turbine 30c is cooled by the cooling air. As described above, the cooling air supply step of this embodiment is started with the execution of the cooling air valve opening/cooling air fan driving step (Sstx11).

When the cooling air valve opening/cooling air fan driving step (Sstx11) is executed, the control device 100x executes the metal temperature determination step (Sst12) same as the metal temperature determination step (Sst12) of the first embodiment. When the control device 100x determines in the metal temperature determination step (Sst12) that the temperature Tm of the first stage stator blade detected by the metal temperature detector 96 is equal to or less than the predetermined temperature Tms, the control device 100x regards the determination as the completion of the cooling of each of the steam turbines 30a, 30b, and 30c to execute a cooling air fan stopping/cooling air valve closing step (Sstx13) same as the cooling air fan stopping/cooling air valve closing step (Sst13) of the first embodiment. However, in the cooling air fan stopping/cooling air valve closing step (Sstx13), the control device 100x sends a close instruction to the first cooling air valve 91a and the second cooling air valve 91b. As a result, the cooling air does not flow to each of the steam turbines 30a, 30b, and 30c, and the cooling air supply step and the steam turbine cooling step (Sstx) are ended.

In this manner, a stopping process of the steam turbine plant is completed.

As described above, also in this embodiment, as in the first embodiment, in the surplus steam supply step and the low-temperature steam supply step of the steam turbine cooling step (Sstx), steam is supplied to each of the steam turbines 30a, 30b, and 30c, and each of the steam turbines 30a, 30b, and 30c is cooled by the steam. Therefore, also in this embodiment, the same effects as in the first embodiment can be obtained. That is, also in this embodiment, the cooling completion timing of each of the steam turbines 30a, 30b, and 30c and the steam turbine plant can be accelerated.

Modification Example

In each embodiment described above, in a case where the boiler cooling is completed during the low-temperature steam supply step, the cooling air supply step is executed after the low-temperature steam supply step is ended. However, even after the boiler cooling is completed, the low-temperature steam supply step may continue until the temperature of the first stage stator blade is equal to or less than the predetermined temperature. In this case, it is not necessary to provide the cooling air fan 55 and the cooling air line 90x.

In each embodiment described above, in order to execute the surplus steam supply step, the bypass line 80 and the surplus steam valve 81 are provided. However, the surplus steam supply step can be executed without providing the bypass line 80 and the surplus steam valve 81. In a case where the surplus steam supply step is executed without providing the bypass line 80 and the surplus steam valve 81, the control device 100x sends an open instruction to the shut-off valve 78 and sends a slight open instruction to reduce the valve opening degree to the adjustment valve 79. As a result, the steam from the superheater 23 flows to the steam turbine 30 through the main steam line 77, the shut-off valve 78, and the adjustment valve 79.

In each embodiment described above, the surplus steam supply step is executed in the steam turbine cooling step. However, the surplus steam supply step may not be executed in the steam turbine cooling step. In this case, the bypass line and the surplus steam valve for executing the surplus steam supply step can be omitted.

In the embodiments described above, in the low-temperature steam supply step, the low-temperature steam at a constant temperature is supplied to the steam turbine. However, when a predetermined condition is satisfied during the low-temperature steam supply step, the control device may send an instruction to lower the temperature of the low-temperature steam to the temperature reducer 52. In this case, the predetermined condition is that the time from the start time point of the low-temperature steam supply step to the current time point has passed the predetermined time or more, the temperature of the first stage stator blade of the steam turbine is equal to or less than the predetermined temperature, or the like. In addition, as a method of lowering the temperature of the low-temperature steam, there is a method of increasing the opening degree of the temperature reduction water adjustment valve 54 to increase the amount of water sprayed from the nozzle 53 of the temperature reducer 52. In this manner, when the temperature of the low-temperature steam is lowered according to the condition in the low-temperature steam supply step, it is possible to suppress the thermal shock with respect to the steam turbine and to efficiently cool the steam turbine 30.

The steam turbine plant of each embodiment described above includes the starter motor 49 that rotates the gas turbine rotor 19 at the time of activation. However, in a case where power from the outside is supplied to the generator 45 and the generator 45 functions as the starter motor, it is not necessary to separately provide a starter motor.

The steam turbine plant of each embodiment described above is a single-shaft combined cycle plant. However, a double-shaft combined cycle plant may be used which includes a generator that is driven by the rotation of the gas turbine rotor 19, and a generator that is a separate generator from the generator and generates power by the rotation of the steam turbine rotor.

In the steam turbine plant of each embodiment described above, the generator is driven by the steam turbine. However, for example, other devices such as pumps may be driven by the steam turbine.

The steam turbine plant of each embodiment described above is a combined cycle plant including the gas turbine, the heat recovery steam generator, and the steam turbine. However, the steam turbine plant may not include the gas turbine. In this case, the boiler is a conventional boiler having a furnace.

The low-temperature steam generation source 50 of each embodiment described above includes the auxiliary boiler 51 and the temperature reducer 52. However, in a case where the steam generated by the auxiliary boiler is steam having a sufficient temperature to cool the steam turbine, it is not necessary to provide the temperature reducer 52. In addition, in a case where there are a plurality of steam turbine plants on one site, when there is a steam turbine plant in operation at the time of stopping one steam turbine plant, a boiler of the steam turbine plant in operation may be used as an auxiliary boiler.

INDUSTRIAL APPLICABILITY

According to an aspect of the invention, the cooling end of the steam turbine can be accelerated.

REFERENCE SIGNS LIST

10: gas turbine
11: compressor
12: compressor rotor
13: compressor casing
14: combustor
15: turbine
16: turbine rotor
17: turbine casing
19: gas turbine rotor
20, 20x: heat recovery steam generator (or boiler)
21: economizer
22: evaporator
22a: drum
23: superheater
24: repeater
30: steam turbine
30a: high-pressure steam turbine
30b: medium-pressure steam turbine
30c: low-pressure steam turbine
31: steam turbine rotor
32: rotor shaft
33: rotor blade row
34: steam turbine casing
36: stator blade row
39, 39c: shaft seal device
40: condenser
41: condenser casing
42: heat transfer tube
45: generator
46: generator rotor
47: generator casing
49: starter motor
50: low-temperature steam generation source
51: auxiliary boiler (second boiler)
52: temperature reducer 53: nozzle
54: temperature reduction water adjustment valve
55: cooling air fan (cooling air supplier)
59: pressure control valve
60: connection line
63: external system
61: transformer
62: circuit breaker
65: fuel supply line
66: fuel valve
70: exhaust line
71: vacuum pump
72: outside air line
73: vacuum breaker valve
75: supply water line
76: water supply pump
77: main steam line
77a: first main steam line
77b: second main steam line
78: shut-off valve
78a: first shut-off valve
78b: second shut-off valve
79: adjustment valve (main steam adjustment valve)
79a: first adjustment valve (main steam adjustment valve)
79b: second adjustment valve (main steam adjustment valve)
80: surplus steam bypass line (or bypass line)
80a: first surplus steam bypass line (or first bypass line)
80b: second surplus steam bypass line (or second bypass line)
81: surplus steam bypass valve (or surplus steam valve)
81a: first surplus steam bypass valve (or first surplus steam valve)
81b: second surplus steam bypass valve (or second surplus steam valve)
82, 82x: low-temperature steam line
82m: low-temperature steam line
82a: first low-temperature steam line
82b: second low-temperature steam line
83: low-temperature steam valve
83a: first low-temperature steam valve
83b: second low-temperature steam valve
84: drain discharge line
84a: first drain discharge line
84b: second drain discharge line
85: drain valve
85a: first drain valve
85b: second drain valve
86: shaft seal steam line
87: shaft seal steam valve
88: boiler water discharge line
88a: first boiler water discharge line
88b: second boiler water discharge line
89: boiler water discharge valve
89a: first boiler water discharge valve
89b: second boiler water discharge valve
90, 90x: cooling air line
90m: main cooling air line
90a: first cooling air line
90b: second cooling air line
91: cooling air valve
91a: first cooling air valve
91b: second cooling air valve
92: high-pressure steam recovery line
93: ventilator line
94: ventilator valve
95: low-pressure steam line
96: metal temperature detector
97: steam pressure detector
98: heat transfer tube temperature detector
99: power detector (or output detector)
100, 100x: control device
A: air
EG: exhaust gas
F: fuel
Ar: axis

The invention claimed is:

1. A steam turbine plant comprising:
a first boiler that generates steam;
a fuel valve that adjusts a flow rate of a fuel for generating the steam;
a low-temperature steam generation source that generates low-temperature steam independently of the first boiler;
a steam turbine that is driven by the steam from the first boiler;
a main steam line that guides the steam generated by the first boiler to a steam inlet of the steam turbine;
a main steam adjustment valve that is provided to the main steam line, and adjusts a flow rate of the steam flowing into the steam turbine from the first boiler;
a low-temperature steam line that is connected to the low-temperature steam generation source, and guides the low-temperature steam from the low-temperature steam generation source to the main steam line at a position closer to the steam turbine than the main steam adjustment valve;
a low-temperature steam valve that is provided to the low-temperature steam line, the low-temperature steam valve being operable to adjust a flow rate of the low-temperature steam flowing in the low-temperature steam line; and
a control device configured to send an open instruction to the low-temperature steam valve after sending a close instruction to the fuel valve,
wherein the low-temperature steam generation source has a second boiler that generates steam independently of the first boiler, and a temperature reducer that reduces a temperature of the steam from the second boiler to generate the low-temperature steam.

2. The steam turbine plant according to claim 1, further comprising:
a drain discharge line that is connected to the low-temperature steam line to be closer to the low-temperature steam generation source than the low-temperature steam valve, the drain discharge line being configured to discharge the low-temperature steam and drain the low-temperature steam in the low-temperature steam line; and
a drain valve that is provided to the drain discharge line,
wherein the control device is operable to send an open instruction to the drain valve after sending a close instruction to the fuel valve, and send a close instruction to the drain valve and send an open instruction to the low-temperature steam valve when a predetermined time passes after the open instruction is sent to the drain valve.

3. The steam turbine plant according to claim 1, further comprising:
a bypass line that branches from the main steam line at a position closer to the first boiler than the main steam adjustment valve, and guides the steam from the first boiler to the main steam line at a position closer to the steam turbine than the main steam adjustment valve;

a surplus steam valve that adjusts a flow rate of the steam flowing in the bypass line; and
a pressure detector that detects a pressure in the main steam line at a position closer to the first boiler than the main steam adjustment valve,
wherein the control device sends a close instruction to the main steam adjustment valve and an open instruction to the surplus steam valve in accordance with the transmission of the close instruction to the fuel valve, and sends an open instruction to the low-temperature steam valve when the pressure detected by the pressure detector is equal to or less than a predetermined pressure.

4. The steam turbine plant according to claim 1, further comprising:
a pressure detector that detects a pressure in the main steam line at a position closer to the first boiler than the main steam adjustment valve,
wherein the control device is operable to send a slight open instruction to reduce a valve opening degree to the main steam adjustment valve in accordance with the transmission of the close instruction to the fuel valve, and send an open instruction to the low-temperature steam valve when the pressure detected by the pressure detector is equal to or less than a predetermined pressure.

5. The steam turbine plant according to claim 1, further comprising:
a condenser that returns the steam from the steam turbine to water;
a supply water line that guides water in the condenser to the first boiler;
a pump that is provided to the supply water line, and sends the water in the condenser to the first boiler;
a boiler water discharge line that is connected to a tube or drum through which water or steam passes in the first boiler, and discharges the water or steam in the tube or drum to an outside of the first boiler; and
a boiler water discharge valve that is provided to the boiler water discharge line, and adjusts a flow rate of a fluid flowing in the boiler water discharge line,
wherein the control device sends a close instruction to the fuel valve, and then sends an open instruction to the boiler water discharge valve in a state of continuing to drive the pump.

6. The steam turbine plant according to claim 5, wherein the boiler water discharge line is connected to the condenser.

7. The steam turbine plant according to claim 5, wherein the control device sends an open instruction to the boiler water discharge valve such that at least a part of a time zone during which the low-temperature steam valve is open overlaps a time zone during which the boiler water discharge valve is open.

8. The steam turbine plant according to claim 5, further comprising:
a temperature detector that detects a temperature of a location where the steam from the first boiler comes into contact with the steam turbine;
a cooling air supplier that sends cooling air for cooling the steam turbine, into the steam turbine; and
a cooling air line that is connected to the cooling air supplier, and guides the cooling air to the main steam line at a position closer to the steam turbine than the main steam adjustment valve,
wherein the control device sends a supply instruction to the cooling air supplier after sending a close instruction to the low-temperature steam valve when determining that cooling of the first boiler is completed before the temperature detected by the temperature detector is equal to or less than the predetermined temperature, and sends a close instruction to the low-temperature steam valve when determining that the temperature detected by the temperature detector is equal to or less than the predetermined temperature before cooling of the first boiler is completed.

9. The steam turbine plant according to claim 1, further comprising:
a gas turbine that is driven by combusting a fuel,
wherein the first boiler is a heat recovery steam generator that generates steam by heat of combustion gas discharged from the gas turbine, and
the fuel valve is a valve that adjusts a flow rate of the fuel to be supplied to the gas turbine.

10. The steam turbine plant according to claim 9, further comprising:
a motor that rotates a gas turbine rotor of the gas turbine,
wherein after sending a close instruction to the fuel valve, the control device sends a spin operation instruction to the motor at a timing in which at least a part of a time zone during which the low-temperature steam valve is open overlaps a time zone during execution of a spin operation so as to execute the spin operation in which the gas turbine rotor is rotated at a rotation speed lower than a rated rotation speed of the gas turbine.

11. A steam turbine plant comprising:
a boiler that generates steam;
a fuel valve that adjusts a flow rate of a fuel for generating the steam;
a low-temperature steam generation source that generates low-temperature steam independently of the boiler;
a steam turbine that is driven by the steam from the boiler;
a main steam line that guides the steam generated by the boiler to a steam inlet of the steam turbine,
a main steam adjustment valve that is provided to the main steam line, and adjusts a flow rate of the steam flowing into the steam turbine from the boiler,
a low-temperature steam line that is connected to the low-temperature steam generation source, and guides the low-temperature steam from the low-temperature steam generation source to the main steam line at a position closer to the steam turbine than the main steam adjustment valve;
a low-temperature steam valve that is provided to the low-temperature steam line, the low-temperature steam valve being operable to adjust a flow rate of the low-temperature steam flowing in the low-temperature steam line,
a control device configured to send an open instruction to the low-temperature steam valve after sending a close instruction to the fuel valve, and
a temperature detector that detects a temperature of a location where the steam from the boiler comes into contact with the steam turbine,
wherein the control device is operable to send a close instruction to the low-temperature steam valve when the temperature detected by the temperature detector is equal to or less than a predetermined temperature.

12. A cooling method of a steam turbine plant including a boiler that generates steam, a steam turbine that is driven by the steam from the boiler, a main steam line that guides the steam generated by the boiler to a steam inlet of the steam turbine, and a main steam adjustment valve that is provided to the main steam line, and adjusts a flow rate of the steam flowing into the steam turbine from the boiler, the cooling method executing:

a fuel stopping step of stopping a supply of a fuel for generating steam in the boiler; and a low-temperature steam supply step of guiding low-temperature steam from a low-temperature steam generation source that generates low-temperature steam independently of the boiler, to the main steam line at a position closer to the steam turbine than the main steam adjustment valve, after the fuel stopping step.

13. The cooling method of a steam turbine plant according to claim 12, wherein the steam turbine plant includes
a low-temperature steam line that is connected to the low-temperature steam generation source, and guides the low-temperature steam from the low-temperature steam generation source to the main steam line at a position closer to the steam turbine than the main steam adjustment valve, and
a low-temperature steam valve that is provided to the low-temperature steam line, and adjusts a flow rate of the low-temperature steam flowing in the low-temperature steam line, and the cooling method executes
a drain discharge step of discharging the low-temperature steam and drain of the low-temperature steam in the low-temperature steam line on a side closer to the low-temperature steam generation source than the low-temperature steam valve, after the fuel stopping step, and
the low-temperature steam supply step by opening the low-temperature steam valve, after the drain discharge step.

14. The cooling method of a steam turbine plant according to claim 12, further executing:

a main steam stopping step of closing the main steam adjustment valve in accordance with the fuel stopping step; and
a surplus steam supply step of supplying steam in the main steam line on a side closer to the boiler than the main steam adjustment valve, to the main steam line on a side closer to the steam turbine than the main steam adjustment valve after the fuel stopping step and the main steam stopping step,
wherein the low-temperature steam supply step is executed when a pressure in the main steam line at a position closer to the boiler than the main steam adjustment valve is equal to or less than a predetermined pressure.

15. The cooling method of a steam turbine plant according to claim 12, wherein the steam turbine plant includes
a condenser that returns the steam from the steam turbine to water,
a supply water line that guides water in the condenser to the boiler, and
a pump that is provided to the supply water line, and sends the water in the condenser to the boiler, and
the cooling method executes, after the fuel stopping step,
a boiler cooling step of discharging water or steam in a tube through which the water or steam passes in the boiler, to an outside of the boiler, in a state of continuing to drive the pump.

16. The cooling method of a steam turbine plant according to claim 15, wherein at least a part of a time zone during execution of the low-temperature steam supply step overlaps a time zone during execution of the boiler cooling step.

17. The cooling method of a steam turbine plant according to claim 15, wherein after the execution of the low-temperature steam supply step, when cooling of the boiler is completed before a temperature of a location where the steam from the boiler comes into contact with the steam turbine is equal to or less than a predetermined temperature, the low-temperature steam supply step is ended and a cooling air supply step of sending cooling air into the steam turbine is executed, and
when the temperature of the location where the steam from the boiler comes into contact with the steam turbine is equal to or less than the predetermined temperature before cooling of the boiler is completed, the low-temperature steam supply step is ended.

18. The steam turbine plant according to claim 1, further comprising:

a condenser that returns the steam from the steam turbine to water,
wherein the control device sends a close instruction to the fuel valve, and then sends an open instruction to the low-temperature steam valve before a vacuum state of the condenser is broken.

* * * * *